United States Patent
Park et al.

(10) Patent No.: US 10,656,973 B2
(45) Date of Patent: May 19, 2020

(54) AUTOMATED API EVALUATION BASED ON API PARAMETER RESOLUTION

(71) Applicant: FUJITSU LIMITED, Kawasaki-shi, Kanagawa (JP)

(72) Inventors: Junhee Park, San Jose, CA (US); Mehdi Bahrami, San Jose, CA (US); Wei-Peng Chen, Fremont, CA (US)

(73) Assignee: FUJITSU LIMITED, Kawasaki (JP)

( * ) Notice: Subject to any disclaimer, the term of this patent is extended or adjusted under 35 U.S.C. 154(b) by 15 days.

(21) Appl. No.: 16/111,043

(22) Filed: Aug. 23, 2018

(65) Prior Publication Data
US 2020/0065160 A1 Feb. 27, 2020

(51) Int. Cl.
*G06F 9/54* (2006.01)
*G06F 8/41* (2018.01)
*G06F 8/10* (2018.01)
*G06F 8/36* (2018.01)
*G06N 20/00* (2019.01)
*G06F 16/907* (2019.01)

(52) U.S. Cl.
CPC ............. *G06F 9/54* (2013.01); *G06F 8/10* (2013.01); *G06F 8/36* (2013.01); *G06F 8/42* (2013.01); *G06F 16/907* (2019.01); *G06N 20/00* (2019.01)

(58) Field of Classification Search
CPC . G06F 9/54; G06F 16/907; G06F 8/10; G06F 8/36; G06F 8/42; G06N 20/00
USPC .................... 717/104, 124; 706/12
See application file for complete search history.

(56) References Cited

U.S. PATENT DOCUMENTS

| 7,337,431 B1 * | 2/2008 | Barnes | G06F 11/3664 714/E11.207 |
| 7,676,794 B2 * | 3/2010 | Akiyama | G06F 8/30 714/38.14 |
| 2010/0332473 A1 * | 12/2010 | Brodsky | G06F 8/75 707/736 |

(Continued)

OTHER PUBLICATIONS

Alazab, M., et al., Zero-day malware detection based on supervised learning algorithms of API call signatures, Proceedings of the Ninth Australasian Data Mining Conference—vol. 121, Dec. 1-2, 2011, pp. 171-182, [retrieved on Aug. 13, 2019], Retrieved from the Internet.*

(Continued)

*Primary Examiner* — Geoffrey R St Leger
(74) *Attorney, Agent, or Firm* — Maschoff Brennan

(57) ABSTRACT

A method of evaluating and selecting an application programming interface (API). The method includes accessing source-code in computer programming languages from an API repository. The method includes training a machine learning classifier using generalized, extracted API-calls to learn variations of API-call programming language syntaxes through usage of the API-call programming language syntaxes in the source-code. The method includes building API-call models suitable for the computer programming languages and building a parameter relations graph based on backtracking data-flow from API-calls that are extracted from public project repositories based on the API-call model. The method includes retrieving sample parameter values from the parameter relations graph. The method includes implementing the sample parameter values in an evaluation interface to evaluate functionality of an API in a software application.

20 Claims, 15 Drawing Sheets

(56) References Cited

U.S. PATENT DOCUMENTS

2013/0014089 A1* 1/2013 Precious ............. G06F 11/3672
                                                    717/131
2018/0285170 A1* 10/2018 Gamon .................. G06F 9/541
2019/0114417 A1* 4/2019 Subbarayan ............ H04L 41/16
2019/0213057 A1* 7/2019 Nitta ..................... G06N 20/00

OTHER PUBLICATIONS

Zamanirad, S., et al., Programming bots by synthesizing natural language expressions into API invocations, 32nd IEEE/ACM International Conference on Automated Software Engineering (ASE), Oct. 30-Nov. 3, 2017, p. 832-837, [retrieved on Aug. 14, 2019], Retrieved from the Internet.*
U.S. Appl. No. 15/729,522, filed Oct. 10, 2017.
U.S. Appl. No. 15/851,734, filed Dec. 1, 2017.
Wittern et al., "Statically Checking Web API Requests in JavaScript" (Proceeding ICSE '17, May 2017).

* cited by examiner

```
$(document) ready (function(){
    var clientID = '1e31ec2d23d0411c94';
    var searchHashtag = '77e1c83b';
    $('#submitHashtag').click(function(_{
        searchHashtag = $('#searchTag').val();
        searchInstgram(searchHashtag);
    }
    function searchInstagram(tag) {
        $.ajax({
            type:"GET",
            dataType:"jsonp",
            cache: false,
            url: "https://api.instagram.com/v1/tags/" + tag
              + "/media/recent?client_id=" + clientID
            success: function (data) {
                for (var i = 0; i<data.data.length; i++) {
                    if (data.data[i].location !=null) {
                        data.data[i];
}}}});})
```

FIG. 5A

AUTOMATED API EVALUATION BASED ON API PARAMETER RESOLUTION

FIELD

The embodiments discussed herein are related to automated application programming interface (API) evaluation based on API parameter resolution.

BACKGROUND

An application programming interface (API) is a set of protocols, procedures, and tools that are used to build software applications. API documentation specifies how other software components interact with the API based on its definition. APIs may also be used to show the results in a graphical user interface (GUI) components. An API may expose at least some functions and/or data of a software application that enables other applications to use resources of the API without concern for implementation of the functions or data.

APIs enable integration of computer applications and interactivity between computing systems. In website development, computer application development, and in other implementations, developers may incorporate one or more APIs. The APIs may be implemented to access or interface with another computing system or computing application. For example, the API may be used to access information, submit queries, transmit data, etc. from a remote computing system via a communication network.

Before the incorporation of the APIs into the computer application, the developer may evaluate one or more of a large number of available APIs. For instance, an application developer be building a simple weather application. The application developer may has several options such as an API provided by Google®, Weather.com®, AccuWeather®, Yahoo® weather, etc. The application developer may test out the available APIs before incorporating one of the available APIs into the weather application.

In some existing systems, an API evaluation interface may be used by the developer. In the API evaluation interface, the developer manually enters parameters to test a single endpoint within the API under evaluation. For instance, to evaluate an online music API, the developer may have to manually input an access Token, a set of parameters such as "playlistId," an "ownerId," a "userId," etc. Each of these parameters are manually entered (e.g., typed) into the API evaluation interface. The API evaluation interface receives the parameters and evaluates the functionality of the API based on the parameters. For instance, the API evaluation interface may confirm whether the API output is as expected or advertised, whether the output returns the correct values, etc. Accordingly, evaluation of a large number of APIs may be time consuming, resource intensive, and inefficient.

The subject matter claimed herein is not limited to embodiments that solve any disadvantages or that operate only in environments, such as those described. Rather, this background is only provided to illustrate one example technology area where some embodiments described herein may be practiced.

SUMMARY

According to an aspect of an embodiment, a method of evaluating and selecting an application programming interface (API). The method may include accessing source-code in two or more computer programming languages from an API repository. The method may include training a machine learning classifier using a generalized, extracted API-calls to learn variations of API-call programming language syntaxes through usage of the API-call programming language syntaxes in the source-code. The method may include building API-call models suitable for the computer programming languages based on the machine learning classifier. The method may include building a parameter relations graph based on the backtracking data-flow from API-calls that are extracted from public, source-code project repositories based on the API-call model. The method may include retrieving sample parameter values from the parameter relations graph. The method includes implementing the sample parameter values in an evaluation interface to evaluate functionality of an API in a software application.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which:

FIG. 5A depicts an a dataflow backtrack process that may be implemented by the source-code processor component of FIG. 4;

DESCRIPTION OF EMBODIMENTS

Figure 1:
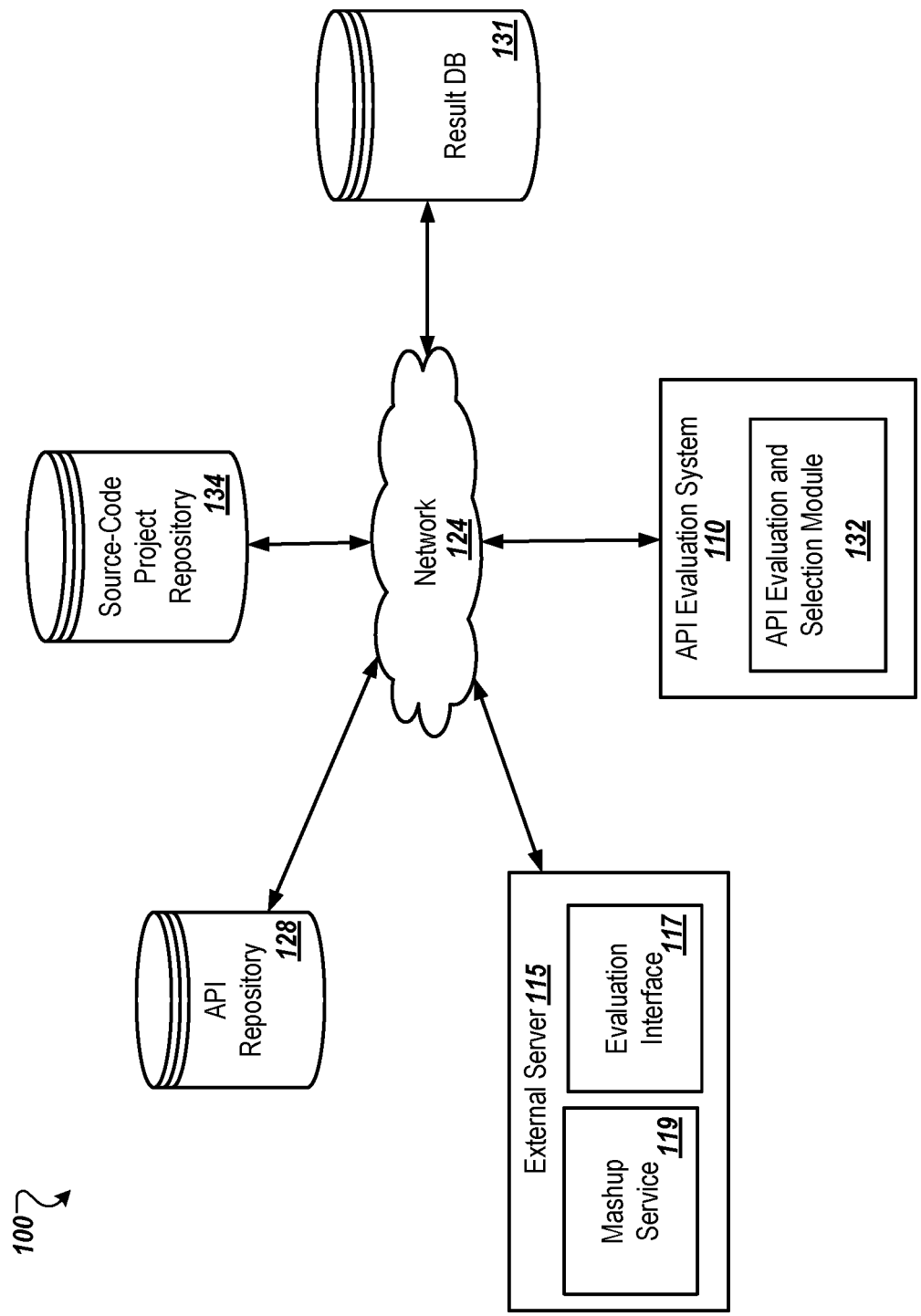
FIG. 1 illustrates a block diagram of an example operating environment.

An application programming interface (API) enables integration of computer applications and interactivity between computing systems. Developers may incorporate one or more APIs into a website, a computer application, and in another computer-related implementation. The APIs may be implemented to access or interface with another computing system or computing application.

Before the incorporation of the APIs into the computer application, the developer may evaluate one or more of a large number of available APIs using a manual API evaluation interface. In the manual API evaluation interface, one or more parameters are manually entered and the functionality of the API is evaluated based on the entered parameters. Accordingly, evaluation of a large number of APIs may be time consuming, resource intensive, and inefficient.

Accordingly, some embodiments described in the present disclosure relate to evaluation and selection of APIs for integration into a software application, a website, or another computer-related implementation. In particular, some embodiments relate to computer-implemented techniques to resolve parameter sample values, which may be used in evaluation and selection of APIs. In some embodiments, machine-learning techniques are used to build API-call models from one or more active source-codes. The API-call models are then used to search API repositories and other relevant websites for APIs. The API-call models may enable extraction of API calls and other relevant codes from active source-codes written in two or more different programming languages. A parameter relations graph may be built, from which sample parameter values may be retrieved. Parameter metadata from the API repositories and the sample values of resolved parameters may then be used to resolve the parameters of API endpoints that are not found in the searches of public project repositories.

Resolution of the parameters of API endpoints that are not found may increase the efficiency of the evaluation of the APIs. For instance, resolution of the parameters of API endpoints that are not found may increase the coverage of the automated evaluation of the APIs. For example, an API may be composed of one or more endpoints that serve different functions. Some of the endpoints may be more popular than others. Accordingly, examples of the popular endpoints may be found while searching the public project repositories (e.g., using GitHub or Stackoverflow) while the less-popular endpoints may not. Some embodiments in the present disclosure enable the less-popular endpoints to be resolved. In some embodiments, the sample parameter values of the resolved endpoints may be used to resolve the unpopular or otherwise unavailable endpoints.

For instance, execution of an embodiment may result in finding two-three sample values $VAL_A$, $VAL_B$, and $VAL_C$ for parameters $PAR_A$, $PAR_B$, $PAR_C$. The three parameters may be used in a first endpoint of a first API. However, a second endpoint of the first API may not have been found and is thus unresolved. In response to a determination that the second endpoint requires the parameters $PAR_B$, $PAR_C$, the system may resolve the second endpoint with the values $VAL_B$, $VAL_C$, based on the similarity of the parameters between the first endpoint and the second endpoint.

Following evaluation and selection, the APIs may be used in an API mashup. The API mashup enables a software developer to draw one or more APIs from multiple sources and to integrate the one or more APIs into a software application. An API mashup service may be used to ensure APIs are suitable for integration with one another. For instance, an API mashup service may be used to match endpoints of APIs for use in software development. An example of an API mashup service is described in U.S. patent application Ser. No. 15/851,734, which is incorporated herein by reference in its entirety.

Accordingly, the embodiments described in the current disclosure provide a technical solution to the inability of computing systems to generate sample parameter values and to evaluate and select APIs based on the sample parameter values. Moreover, the embodiments describe a technical solution in which machine-learning techniques are used to generate the sample parameter values. Use of the machine learning techniques provides a technical improvement over conventional systems in which manual evaluation techniques are implemented. The sample parameter values may also be used to resolve additional API endpoints. Resolution of the additional API endpoints, which may further improves the efficiency of API evaluation and selection by enabling the evaluation based on API endpoints that were previously unavailable.

Some embodiments described in the present disclosure are related to an Internet-centric technological field. For example, the embodiments described herein relate to information extraction from computing systems using APIs. In some embodiments, computing systems may be communicatively connected via a computing network, such as a network 124 described below.

These and other embodiments are described with reference to the appended Figures in which like item number indicates like function and structure unless described otherwise.

FIG. 1 illustrates a block diagram of an example operating environment 100 arranged in accordance with at least one embodiment described herein. The operating environment 100 may include an automated API evaluation system 110 that is configured to implement one or more API evaluation and selection processes described in the present disclosure. For example, the API evaluation and selection may determine functionality or enable the determination of functionality of an API for use or integration into a software program, a website, or another computer-related implementation. The evaluation and selection may be based on resolution of parameter sample values based on source-code learning and processing. Additionally, the API evaluation system 110 may interact with an API mashup service and/or an evaluation interface. The API mashup service may be used to match endpoints for APIs for use in software development.

The operating environment 100 of FIG. 1 may include the automated API evaluation system 110, a source-code project repository 134, a result database 131 (in the Figures, the "result DB 131"), an external server 115, and an API repository 128. The API evaluation system 110, the source-code project repository 134, the external server 115, the API repository 128, the result DB 131, or some combination thereof may communicate information and data via a network 124. Each of the network 124, the API evaluation system 110, the source-code project repository 134, the result DB 131, the external server 115, and the API repository 128 are briefly described below.

The network 124 may include any communication network configured for communication of signals between any of the components (e.g., 110, 115, 128, 131, and 134) of the operating environment 100. The network 124 may be wired or wireless. The network 124 may have numerous configurations including a star configuration, a token ring configuration, or another suitable configuration. Furthermore, the network 124 may include a local area network (LAN), a wide area network (WAN) (e.g., the Internet), and/or other interconnected data paths across which multiple devices may communicate. In some embodiments, the network 124 may include a peer-to-peer network. The network 124 may also be coupled to or include portions of a telecommunications network that may enable communication of data in a variety of different communication protocols.

In some embodiments, the network 124 includes or is configured to include a BLUETOOTH® communication network, a Z-Wave® communication network, an Insteon® communication network, an EnOcean® communication network, a Wi-Fi communication network, a ZigBee communication network, a HomePlug communication network, a Power-line Communication (PLC) communication network, a message queue telemetry transport (MQTT) communication network, a MQTT-sensor (MQTT-S) communication network, a constrained application protocol (CoAP) communication network, a representative state transfer application protocol interface (REST API) communication network, an extensible messaging and presence protocol (XMPP) communication network, a cellular communication network, any similar communication networks, or any combination thereof for sending and receiving data. The data communicated in the network 124 may include data communicated via short messaging service (SMS), multimedia messaging service (MMS), hypertext transfer protocol (HTTP), direct data connection, wireless application protocol (WAP), e-mail, smart energy profile (SEP), ECHONET Lite, OpenADR, or any other protocol that may be implemented with the API evaluation system 110, the source-code project repository 134, the external server 115, the result DB 131, and the API repository 128.

The API repository 128, the results DB 131, and the source-code project repository 134 may include any memory or data storage, which may be similar to memory 812 elsewhere in the present disclosure. The API repository 128, the results DB 131, and the source-code project repository 134 may include network communication capabilities such that other components in the operating environment 100 may communicate with the API repository 128, the results DB 131, and the source-code project repository 134. For example, the API repository 128, the results DB 131, and the source-code project repository 134 may enable the access of information pertaining APIs by the API evaluation system 110 or components thereof. Additionally, the API repository 128, the results DB 131, and the source-code project repository 134 may be configured to enable storage of information. For instance, the API repository 128, the results DB 131, and the source-code project repository 134 may receive information and data from the API evaluation system 110 via the network 124, which may be stored on the API repository 128, the results DB 131, and the source-code project repository 134.

In some embodiments, the API repository 128 and the source-code project repository 134 may store various data related to APIs. For instance, the API repository 128 and the source-code project repository 134 store machine-readable API specifications, metadata related to parameters of APIs, API endpoints, etc. The API evaluation system 110 may access the various data for use in evaluation and selection of APIs.

Figure 2:
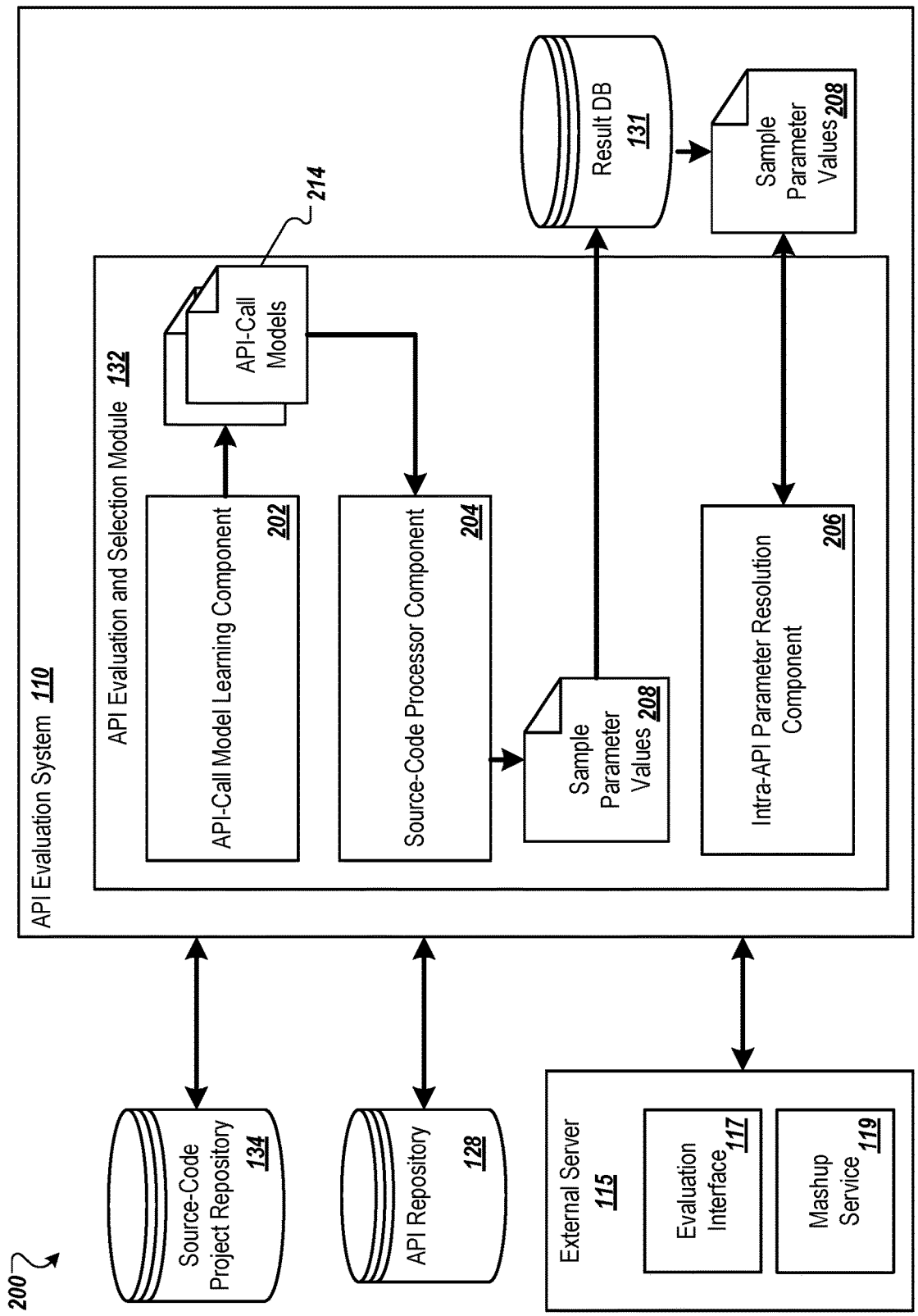
FIG. 2 depicts an example evaluation and selection process that may be implemented by an application programming interface (API) evaluation system of the operating environment of FIG. 1.

In the embodiment of FIG. 1, the result DB 131 is depicted as an external component relative to the API evaluation system 110. In some embodiments, the result DB 131 may be integrated or included in the API evaluation system 110. A configuration in which the result DB 131 is included in the API evaluation system 110 is shown in FIG. 2, described below.

The external server 115 may include a hardware-based computing device that is configured to communicate data and information with one or more of the components of the operating environment 100. The external server 115 may include a mashup service 119 and/or an evaluation interface 117. The mashup service 119 may receive sample parameter values generated by the API evaluation system 110 and determine functionality (e.g., integration capability) of one or more APIs based thereon. Additionally, the mashup service 119 may enable incorporation of one or more APIs into a software application, website, and the like. An example of an API mashup service is described in U.S. patent application Ser. No. 15/851,734, which is incorporated herein by reference in its entirety.

The evaluation interface 117 may include an API evaluation tool. The API evaluation tool may receive the sample parameter values generated by the API evaluation system 110. Based on the sample parameter values, the evaluation interface 117 may determine functionality or integration capability of one or more APIs.

In the embodiment of FIG. 1, the evaluation interface 117 and the mashup service 119 are shown in the external server 115. It may be appreciated with the benefit of this disclosure that in some embodiments of the operating environment 100 the external server 115 may include the mashup service 119 or the evaluation interface 117. Additionally or alternatively, the mashup service 119 and/or the evaluation interface 117 may be integrated with the API evaluation system 110.

The API evaluation system 110 may include a hardware-based computing system. The API evaluation system 110 may be configured to communicate with other components of the operating environment 100 via the network 124. The API evaluation system 110 may include an API evaluation and selection module 132 (hereinafter, "API module 132"). The API module 132 may be configured to implement or control the implementation of one or more processes to evaluate and/or select APIs.

In general, the API module 132 may be configured to determine the sample parameter values, which may be used to evaluate functionality of APIs. For instance, the sample parameter values may be communicated to the mashup service 119 and/or the evaluation interface 117, which may return an indication of functionality of an API corresponding to the sample parameter values. The sample parameter values may be based on an API-call model. The API-call model is built using a machine learning technique described elsewhere in the present disclosure. Accordingly, API-call model may be based on learned variations in API-calls resulting from programming language differences. Additionally, API module 132 may resolve API endpoints using the sample parameter values. For instance, the API module 132 may determine which sample parameter values may be applicable for API endpoints without metadata.

For example, in some embodiments, the API module 132 may be configured to build the API-call model. The API module 132 may access source-code from the API repository 128. The source-code for an API may be written in more than one programming language. Accordingly, to build the API-call model machine learning classifier may be trained using a generalized extracted API-call. The generalized extracted API-call may be configured to learn variations of API-call programming language syntaxes through usage of the API-call programming language syntaxes in the source-code. The resulting API-call model may accordingly be suitable for the two or more computer programming languages.

The API module 132 may also access API-calls from the source-code project repository 134. The API module 132 may be configured to build a parameter relations graph based on the backtracking data-flow from the API-calls based on the API-call model. The API module 132 may be configured to retrieve the sample parameter values from the parameter relations graph. For instance, in some embodiments, the sample parameter values may include the leaf nodes of the parameter relations graph. The API module 132 may be configured to store the sample parameter values in the result DB 131.

In some embodiments, the API module 132 may be configured to resolve an intra-API parameter of one or more API endpoints that is missing from the source-code. For example, the API module 132 may resolve API endpoints missing from the source-code, but that includes the same parameters of an endpoint for which sample parameter values have been determined. The API module 132 may be configured to implement the sample parameter values in the evaluation interface 117 and/or the mashup service 119 to evaluate functionality of an API in a software application, a website, etc.

The API module 132, the mashup service 119, the evaluation interface 117, and one or more components or modules thereof described throughout the present disclosure may be implemented using hardware including a processor, a microprocessor (e.g., to perform or control performance of one or more operations), a field-programmable gate array (FPGA), or an application-specific integrated circuit (ASIC). In some other instances, the API module 132 may be implemented using a combination of hardware and software. Implementation in software may include rapid activation and deactivation of one or more transistors or transistor elements such as may be included in hardware of a computing system (e.g., the API evaluation system 110). Additionally, software defined instructions may operate on information within transistor elements. Implementation of software instructions may at least temporarily reconfigure electronic pathways and transform computing hardware.

Modifications, additions, or omissions may be made to the operating environment 100 without departing from the scope of the present disclosure. For example, the operating environment 100 may include one or more API repositories 128, one or more result DB 131, one or more project repositories 134, one or more external servers 115, one or more API evaluation systems 110, or any combination thereof. Moreover, the separation of various components and servers in the embodiments described herein is not meant to indicate that the separation occurs in all embodiments. For example, the result DB 131 and the mashup service 119 may be integrated with the API evaluation system 110. Moreover, it may be understood with the benefit of this disclosure that the described components and servers may generally be integrated together in a single component or server or separated into multiple components or servers.

FIG. 2 depicts an example evaluation and selection process 200 that may be implemented by the API evaluation system 110 of FIG. 1. FIG. 2 illustrates some of the components and features (e.g., 134, 128, 115, 110, and 132) described with reference to FIG. 1. Descriptions of these components and features are not repeated with reference to FIG. 2.

The API module 132 may include an API-call model learning component (model component) 202, a source-code processor component (code component) 204, and an intra-API parameter resolution component (resolution component) 206. Each of the model component 202, the code component 204, and the resolution component 206 are described below.

The model component 202 may be configured to build and train API-call models 214. The API-call models 214 may be built for two or more different programming languages. The API-call models 214 may be based on API-calls that the model component 202 extracts from source-codes in the source-code project repository 134 and/or the API repository 128.

For example, the model component 202 may extract endpoint metadata from the API repository 128. The model component 202 may use the endpoint metadata to search the source-code project repository 134 to find and to extract some or all possible API-calls for an API. The model component 202 may then classify the API-calls based on programming language and generalize the API-calls. The generalized API-calls may then be used to train a machine learning classifier. After the machine learning classifier is trained, the API-call models 214 may be used to detect API-call codes of the programming languages and to extract API-call codes from the source-code project repository 134 and/or the API repository 128. Some additional details of an example API-call model building process are provided with reference to FIG. 3.

The code component 204 may be configured to search the source-code project repository 134 and/or the API repository 128 for API-calls. The code component 204 may then use the API-call models 214 to extract API-calls and to builds parameter relations graph. The parameter relations graph may be built by backtracking data-flow in the API-calls using the API-call models 214. The code component 204 may then retrieve the sample parameter values 208 from the parameter relations graph.

For example, the code component 204 may be configured to generate and execute queries to the source-code project repository 134. The code component 204 may then utilize API-call models 214 built for the two or more programming languages to find and extract direct API-call code. The code component 204 may then use endpoint metadata information extracted from the API repository 128 to decompose API-call code and classify parameters in the API-call code. For instance, the code component 204 may classify the parameters into four categories (i.e., path, query, header, and body). The code component 204 may extract relationship between variables in API-call code by backtracking data flow and generate the parameter relations graph based on the backtracked data flow. The code component 204 may then extract leaf node values of the parameter relations graph as the sample parameter values 208. The sample parameter values 208 may be stored in the result DB 131 and/or used by the API module 132 to determine functionality of the API using the external server 115. Some additional details of an example parameter relations graph building process are provided with reference to FIGS. 4-5C.

The resolution component 206 may be configured to determine which of the sample parameter values 208 may be applicable for one or more API endpoints that may not be determined by the model component 202 and the code component 204. For instance, the API endpoint may not have source-code and/or API code sufficient for the model component 202 and the code component 204 to determine the sample parameter values 208. Instead, the resolution component 206 may use parameter metadata from the API repository 128 and the sample parameter values 208 from the result DB 131 to support these API endpoints. For instance, responsive to the API endpoints with insufficient information sharing parameters with resolved endpoints (e.g., resolved using the model component 202 and the code component 204 or previously resolved using the resolution component 206); the sample parameter values 208 for the resolved endpoint may be applied to the API endpoint with insufficient information. As above, the sample parameter values 208 for the API endpoints may be stored in the result DB 131 and/or used by the API module 132 to determine functionality of the API using the external server 115. Some additional details of an example API endpoint resolution process are provided with reference to FIGS. 6A and 6B.

Figure 3:
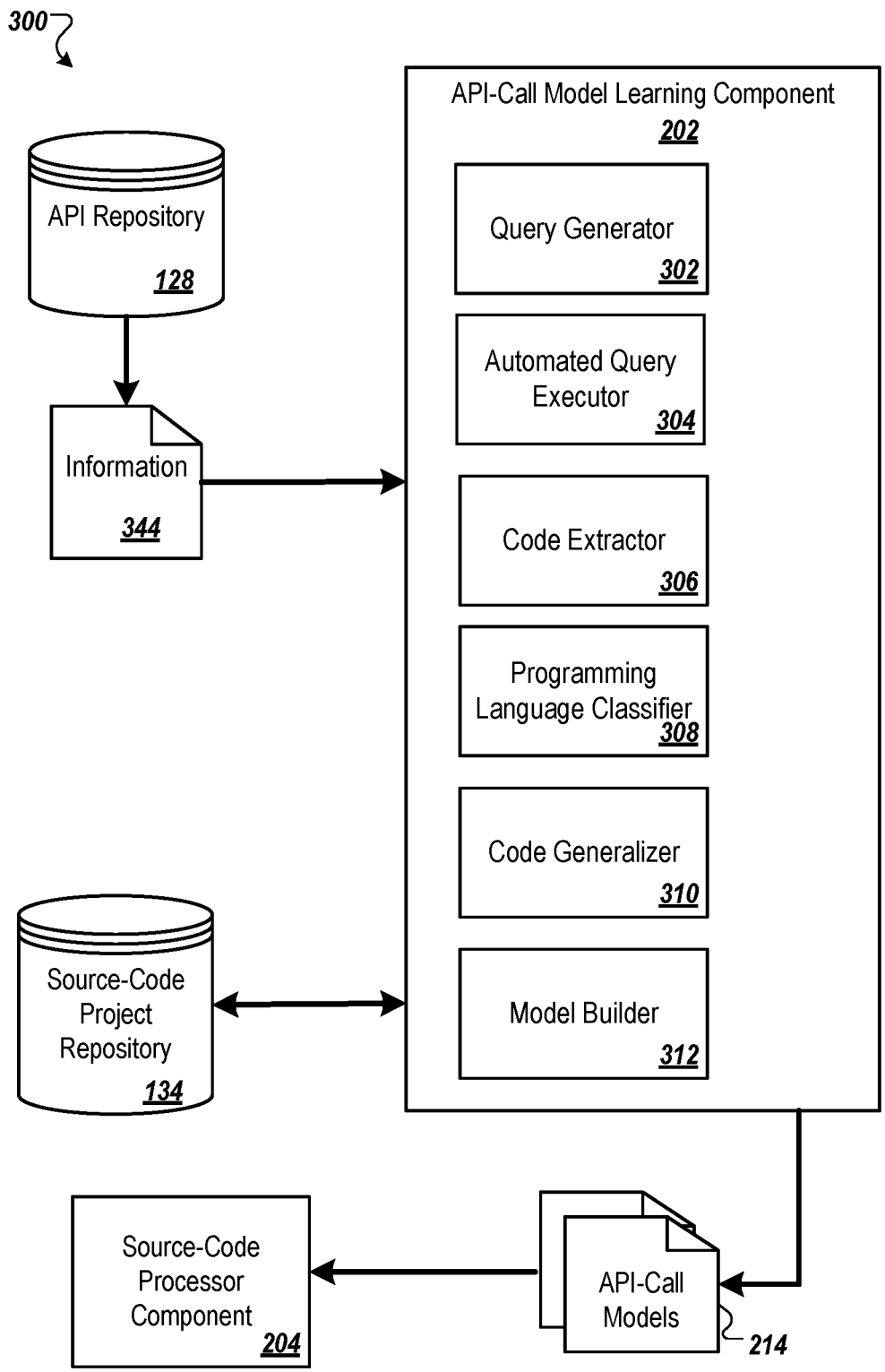
FIG. 3 depicts an example API-call model building process that may be implemented in an API-call model learning component of the API evaluation system of FIG. 2.

FIG. 3 depicts an example API-call model building process 300 that may be implemented in the model component 202 of FIG. 2. FIG. 3 includes the API repository 128, the source-code project repository 134, the code component 204, the API-call models 214 and the model component 202 described above. In the embodiment of FIG. 3, the model component 202 may include a query generator 302, an automated query executor 304, a code extractor 306, a programming language classifier 308, a code generalizer 310, and a model builder 312.

The model component 202 may be configured to extract information 344 from the API repository 128. The information 344 may include API endpoints and parameter metadata information related to a particular API. The query generator 302 may be configured to generate a project repository query based on the information 344. For instance, the query generator 302 may be configured to clean unnecessary strings from a host and basepath URL, and then strip an endpoint at a first parameter placeholder if such parameter placeholder exists in the host and basepath URL. For instance, a host and basepath URL may include
"https://api.fujitsu.com/scanner/v1."
The query generator 302 may clean the strings from the (e.g., "https://") from the host and basepath URL, which may result in as cleaned host and basepath URL. For instance, from the example above, the cleaned host and basepath URL may include:
www.api.fujitsu.com/scanner/v1.
The query generator 302 may then strip the first parameter placeholder. For example, in a path parameter example, a path parameter that is users/{id}/labels may be stripped to /users. Based on the stripped placeholder and the cleaned host and basepath URL, the query generator 302 may generate a project repository query. An example query string that may be implemented in GitHub may be:
github.com/
search?q=www.api.fujitsu.com%2Fscanner%2Fv1+ users%2F+language%3Apython&type=Code&utf8.
The project repository query includes the cleaned host and basepath URL and the stripped first parameter described above. In the example query "https://" is removed from the beginning.

The automated query executor 304 may be configured to execute the query that is generated by the query generator 302. The automated query executor 304 may be configured to execute the query to search through source-codes of public projects in the source-code project repository 134. In some embodiments, the automated query executor 304 uses a browser automation technology such as Selenium®.

The code extractor 306 may be configured to interface with a result page accessed through execution of the query string. The code extractor 306 may extract resulting code snippets and extract one or more lines of code that matches an API endpoint, which may correspond to an API-call. For instance, an example code portion may include:
ARTIST=spoon
ARTIST_ID=curl-silent-X GET "https://api.spotify.com/ v1/search?q=$ARTIST&type=artist&limit=1"|jg 'artist.items|. [length−1].d"ARTIST_ALBUMS=curl- silent-X GET
"https://api.spotify.com/v1/artist/$ARTIST_ID/albums"
self._ArtistName=ArtistName
self._ArtistID=request.get("https://api.spotify.com"+"/ v1/search",
params={"q": ArtistName, "type":"artist","limit":1"}) .json( )["artists"]["items"][0] ["id"]
def getRelatedArtist(self):
r=requests.get("https://api.spotify.com/v1/artists/"+sel- f._ArtistID+"/related-artists"
In the example code portion, the code extractor 306 may be configured to extract:
ARTIST_ALBUMS=curl-silent-X GET
"https://api.spotify.com/v1/artist/$ARTIST_ID/albums"
and
r=requests.get("https://api.spotify.com/v1/artists/"+sel- f._ArtistID+"/related-artists".

The programming language classifier 308 may be configured to classify the extracted API-calls according to a programming language in which the API-call is written. In some embodiments, the programming language classifier 308 may classify the API-calls based on extensions of the code or notation provided by the source-code project repository 134. For example, [API name].py may be indicative of Python programming language, [API name].java may be indicative of JAVA programming language, [API name].js may be indicative of JavaScript programming language, [API name].sh may be indicative of Shell programming language, and [API name].cpp may be indicative of C++ programming language.

The code generalizer 310 may be configured to generalize code of the extracted API-calls. In some embodiments, generalizing the extracted API-call may include replacing endpoints and parameter values from the API-call code with predefined set of notations. The set of notations may include URL, PAYLOAD, ENDPOINT, etc. For example, the API-call code "r=requests.get('https://api.github.com/events')" may be generalized to "r=request.get(ENDPOINT)" and "r=requests.get('https://httpbin.org/get', params={'some': 'data'}) may be generalized to "r=request.get(ENDPOINT, params=PAYLOAD)."

The model builder 312 may be configured to train a machine learning classifier for each or the two or more programming languages. The model builder 312 may use the variations of the API-call codes that were generalized and grouped according to programming language to train the machine learning classifier. The machine learning classifier may be configured to learn variations of the API-call programming language syntaxes through actual usage in application source-codes. Accordingly, the model builder 312 may not require knowledge of programming language syntaxes, which may make the model builder extendable into additional programming languages.

In some embodiments, the model builder 312 may receive the generalized API-call code which allows a machine to find different patterns of API-call in the code. By understanding different pattern, then the machine will be able to extract relevant information (parameter values in this case). The model builder 312 may split the statement if applicable. The model builder 312 may detect the programming language of the split statement. The model builder 312 may extract the various portions of the split statement. The model builder 312 may then generalize the split statement and classify one or more variables. Based on the machine learning classifier, the model component 202 may generate the API-call models 214 for two or more programming languages. The model component 202 may communicate the API-call models 214 to the code component 204.

Figure 4:
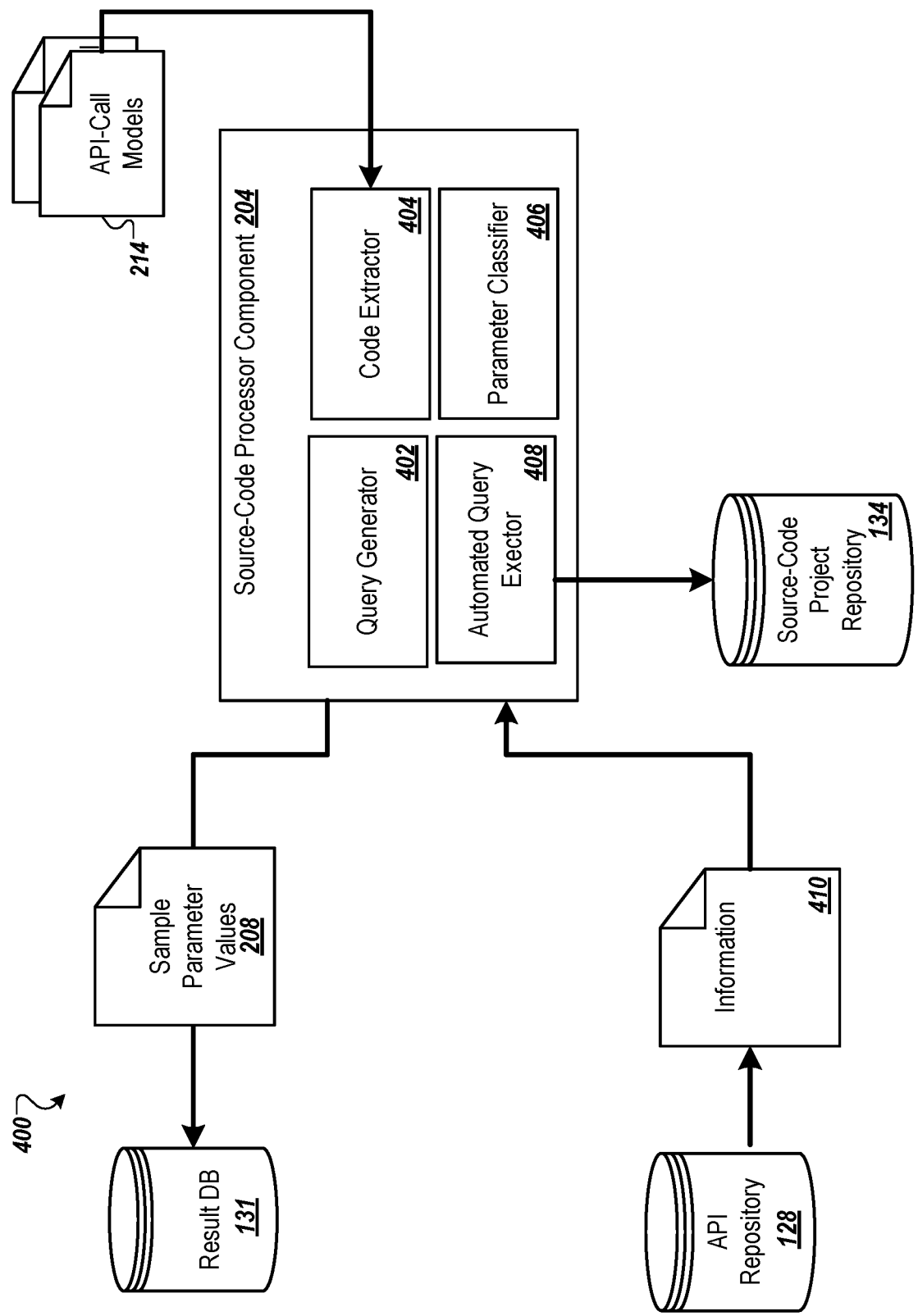
FIG. 4 depicts an example parameter relations graph building process that may be implemented by a source-code processor component of the API evaluation system of FIG. 2.

FIG. 4 depicts an example parameter relations graph building process 400 that may be implemented by the code component 204 of FIG. 2. The embodiment of FIG. 4 includes the result DB 131, the API repository 128, the source-code project repository 134, the API-call models 214, and the sample parameter values 208 described elsewhere in the present disclosure. The code component 204 may be include a query generator 402, a code extractor 404, an automated query executor 408, and a parameter classifier 406.

The code component 204 may be configured to extract information 410 from the API repository 128. The information 410 may include API endpoints and parameter metadata information, for instance.

The query generator 402 may operation substantially similarly to the query generator 302 based on the information 410. For instance, the query generator 402 may be configured to clean unnecessary strings from a host and basepath URL, and then strip an endpoint at a first parameter placeholder if such parameter placeholder exists in the host and basepath URL.

The automated query executor 408 may be substantially similar to the automated query executor 304. For instance, the automated query executor 408 may be configured to execute the query generated by the query generator 402. The automated query executor 408 may be configured to execute the query to search through source-codes of public projects in the source-code project repository 134. In some embodiments, the automated query executor 408 uses a browser automation technology such as Selenium®.

The code extractor 404 may be configured to extract a direct API-call code. The code extractor 404 may extract the direct API-call code using the API-call models 214. For example, the code extractor 404 may receive as input source-codes, which may be written in two or more programming languages. The code extractor 404 may use the API-call models 214 to extract the direct API-call codes from the source-codes.

The parameter classifier 406 may be configured to classify and extract parameters from the API-call codes. For instance, the parameter classifier 406 may decompose the API-call codes and categorize the parameters in the decomposed code into four categories. The four categories may include one or more of path, query header, and body in some embodiments. Path parameters may include variable parts of a URL path. The path parameters may be used to point to a specific resource within a collection. For instance, the path parameters may be used to point to a user identified by ID. In some circumstances, a URL may have two or more of the path parameters, which may be denoted with curly brace. Some example path parameters are "/users/{id}" and "/cars/{carId}/drivers/{driverId}." Query parameters are the most common type of parameters. The query parameters may appear at an end of a request URL after a question mark, with different name=valuepairs separated by an ampersand. Query parameters may be required parameters or may be optional parameters. Example query parameters include "/notes?offset=100&limit=50" and "/pets/findByStatus?status=available." Parameters classified as a header type may include a custom header that is sent with an HTTP request. Example headers include a call to GET/ping that requires the X-Request-ID "X-Request-ID: 77e1c83b-7bb0-437b-bc50-a7a58e5660ac." The parameters classified as body type may include request bodies, which may be used with "create" and "update" operations such as "POST", "PUT", and "PATCH". For instance, body parameters may create a resource using POST or PUT. A request body may include a representation of the resource to be created.

The parameter classifier 406 may use the information 410 to decompose the API-call code and extract the parameters. The parameter classifier 406 may then extract relationships between variables in the API-call code through backtracking dataflow. In general, the backtracking includes tracking a dataflow of the from an assignment side of an expression in the API-call code to an assigned side of another expression in the API-call code. Based on the relationships, the code component 204 may generate a parameter relations graph and extract the sample parameter values from the parameter relations graph.

Figures 5B, 5C:
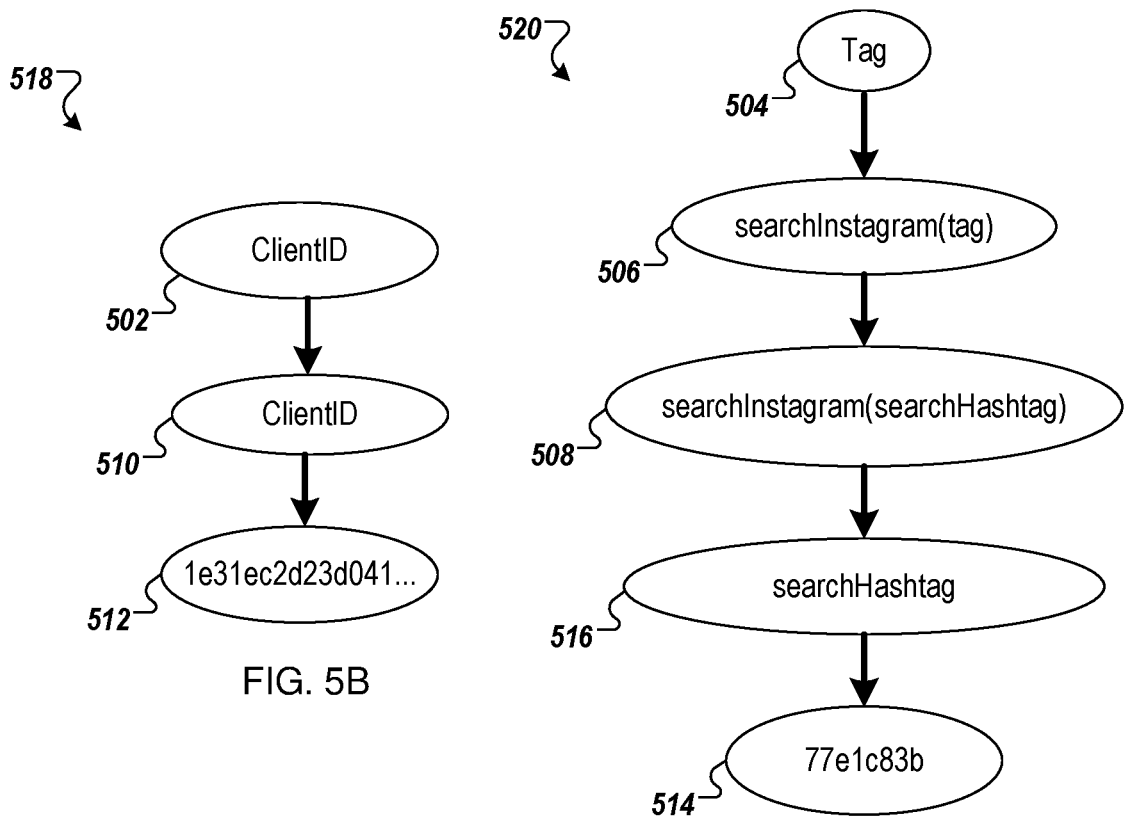
FIG. 5B depicts a first parameter relations graph that may be implemented by the source-code processor component of FIG. 4.
FIG. 5C depicts a second parameter relations graph that may be implemented by the source-code processor component of FIG. 4.

For instance, with references to FIGS. 5A-5C an example of a dataflow backtrack process 500 and parameter relations graphs 518 and 520 are depicted. FIG. 5A depicts a portion of an API-call code 501. A first dataflow 517 may be for "clientID." Backtracking the first dataflow 517 includes moving from "clientID" 502, to "clientID" 510, to "1e31ec2d23d0411c94." The first dataflow 517 corresponds to the first parameter relations graph 518 of FIG. 5B. For instance, the first parameter relations graph 518 includes "clientID" 502, "clientID" 510, and "1e31ec2d23d0411c94" 512.

FIG. 5A depicts a portion of an API-call code 501. A second dataflow 519 may be for "tag." Backtracking the second dataflow 519 includes moving from "tag" 504, to "searchInstagram(tag)" 506, to "searchInstagram(searchHashtag) 508, to "searchHashtag", to "77e1c83b" 514. The second dataflow 519 corresponds to the second parameter relations graph 520 of FIG. 5C. For instance, the second parameter relations graph 520 includes "tag" 504, "searchInstagram(tag)" 506, "searchInstagram(searchHashtag) 508, "searchHashtag", and "77e1c83b" 514.

Referring back to FIG. 4, the code component 204 may retrieve the sample parameter values 208 from the parameter relations graphs (e.g., 518 and 520). For instance, with combined reference to FIGS. 4-5C, the code component 204 may retrieve the leaf nodes "1e31ec2d23d0411c94" 512 and "77e1c83b" 514. The sample parameter value for "tag" may be "77e1c83b" 514. Similarly, the sample parameter value for "clientID" 502 may be "77e1c83b" 514. The code component 204 may store the sample parameter values 208 in the result DB 131 or may communicate the sample parameter values 208 to the external server 115 of FIG. 1.

Figure 6A:
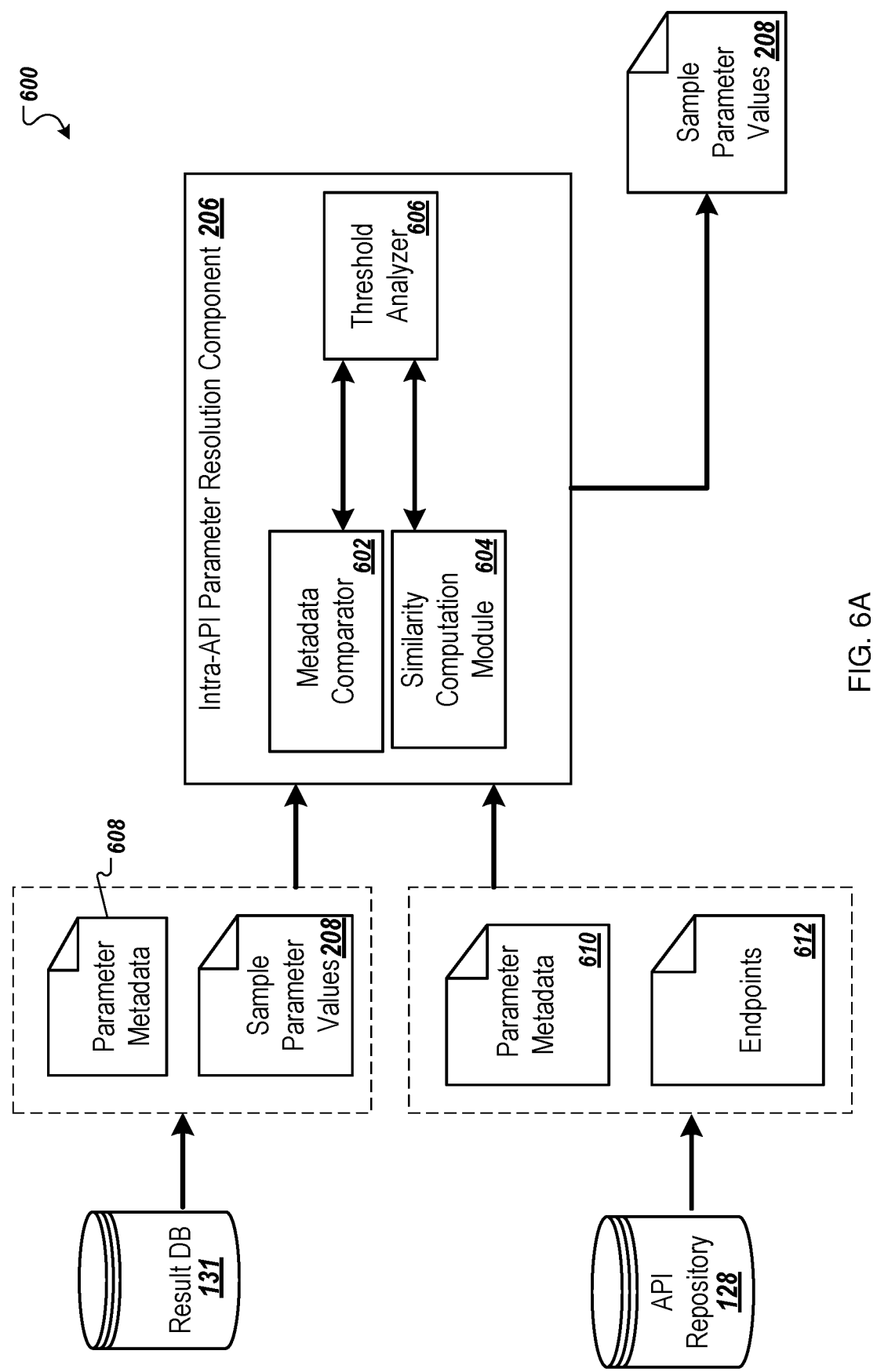
FIG. 6A depicts an example resolution process that may be implemented by a intra-API parameter resolution component of the API evaluation system of FIG. 2.
Figure 6B:
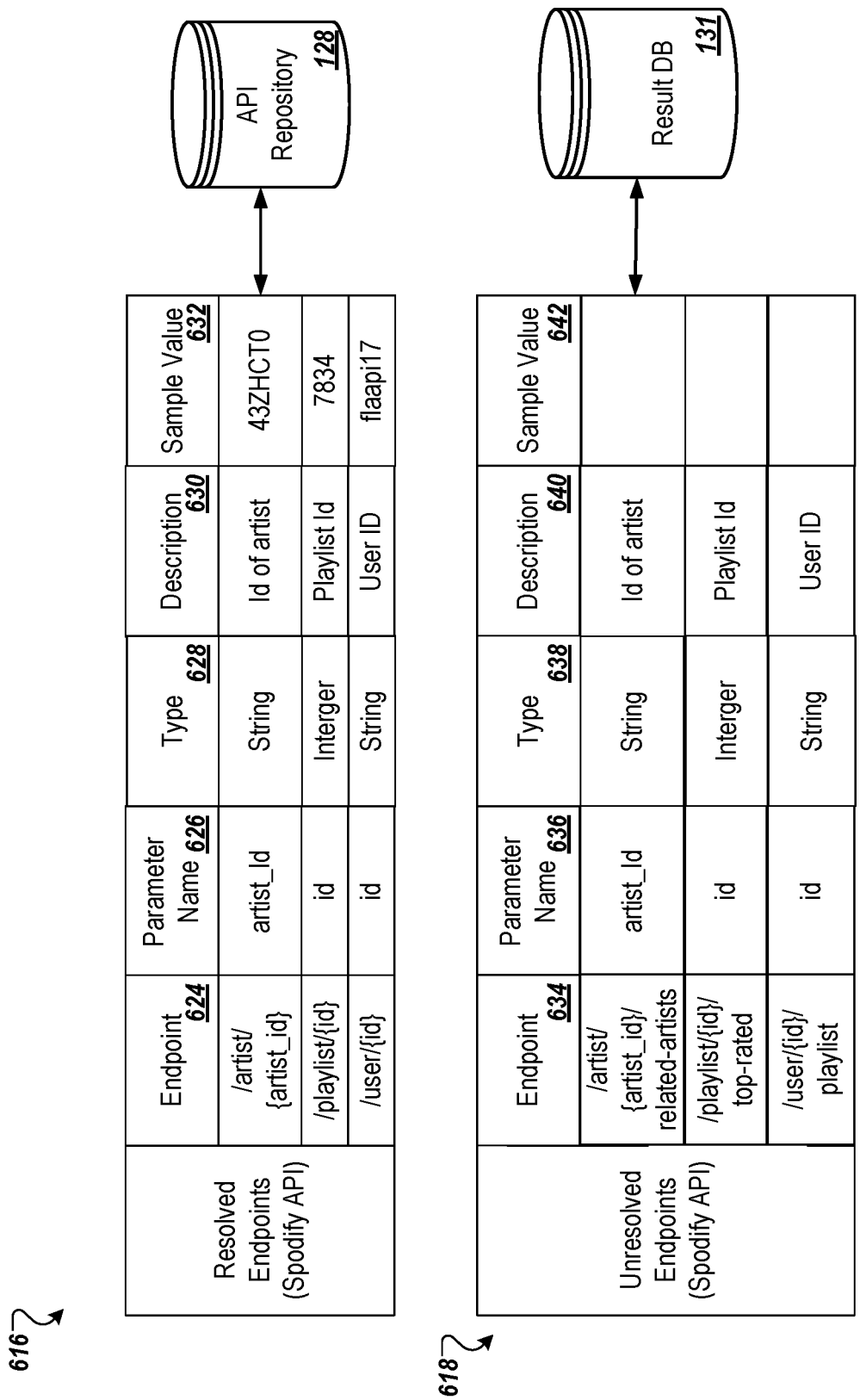
FIG. 6B depicts tables that may be used during the resolution process of FIG. 6A.

FIG. 6A depicts an example resolution process 600 that may be implemented by the resolution component 206. FIG. 6B depicts tables 616 and 618 that may be used during the resolution process 600. In the embodiment of FIG. 6A, the resolution component 206 may include a metadata comparator 602, a similarity computation module 604, and a threshold analyzer 606.

The resolution component 206 may extract the sample parameter values 208 and parameter metadata 608 from the result DB 131. The parameter metadata 608 may include parameter name, type, description, etc. for the sample parameter values 208. The resolution component 206 may extract some or all endpoints 612 and parameter metadata 610 from the API repository 128. The parameter metadata 610 may include the parameter name, type, description, etc. The endpoints 612 may include unresolved endpoints. For example, the endpoints 612 may include endpoints without sufficient information for the model component 202 and the code component 204 to resolve.

The metadata comparator 602 may compare the parameter metadata 608 of one or more of the sample parameter values 208 to the parameter metadata 610 of one or more of the endpoints 612. For example, the metadata comparator may conduct a 1-to-1 matching comparison for type between the two parameters.

For instance, with reference to FIG. 6B, the first table 616 may include resolved endpoints 624. A parameter name 626, a type 628, a description 630, and a sample value 632 are associated with each of the resolved endpoints 620. The second table 618 may include unresolved endpoints 634 listed in a first column. A parameter name 636, a type 638, a description 640, and a sample value 642 may be associated with each of the unresolved endpoints 624. The metadata comparator 602 may conduct a 1-to-1 matching comparison between the type 628 of the resolved endpoint 624 and the type 638 of the unresolved endpoint 634.

In addition, the similarity computation module 604 may compute similarity for parameter name and description between the two parameters. For instance, with respect to FIG. 6B, the similarity computation module 604 may compute a similarity between the parameter name 626 of the resolved endpoint 624 and the parameter name 636 of the unresolved endpoint 634. Additionally, the similarity computation module 604 may compute a similarity between the description 630 of the resolved endpoint 624 and the description 640 of the unresolved endpoint 634. Responsive to a 1-to-1 match between the types (628 and 638) and the calculated similarity between the parameter names (626 and 636) and the descriptions (630 and 640) being below a threshold (e.g., 0.6, 0.7, or another suitable threshold), then the sample value 632 for the resolved endpoint 624 may be used for a corresponding unresolved endpoint 634. For instance, the sample value 632 "43ZHCTO" that is associated with the resolved endpoint "/artist/{artist_id}" may be used for the unresolved endpoint "/artist/{artist_id}/related-artists." The resolution component 206 may output additional sample parameter values 208 for the unresolved parameters.

Figure 7A:
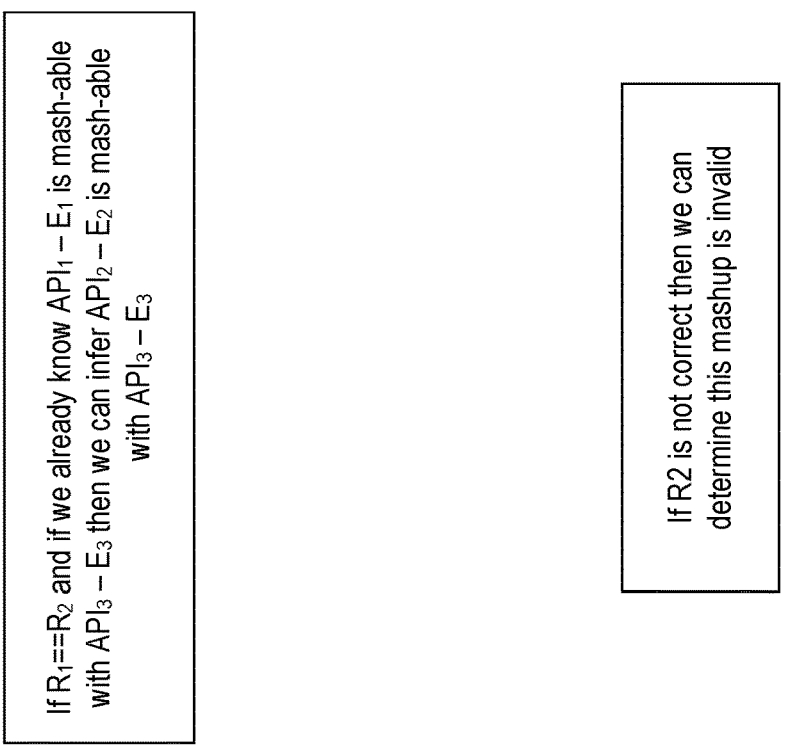
FIG. 7A depicts an example new mashup detection process that may implement in the operating environment of FIG. 1.

FIG. 7A depicts an example new mashup detection process 700 that may implement one or more of the sample parameter values (e.g., 208) generated by the API evaluation system 110. In FIG. 7A, $API_1$ represents a first API, $E_1$ represents a first endpoint, $R_1$ represents a first native result, and $P_1$ represents a first parameter of the first endpoint. Similarly, API2 represents a second API, $E_2$ represents a second endpoint, $R_2$ represents a second native result, and $P_2$ represents a second parameter of the second endpoint. The API evaluation system 110 may provide a sample parameter value for the first and second parameters ($P_1$ and $P_2$). An API-call may be communicated to a native host site. Responsive to the API-call, the first and second native results ($R_1$ and $R_2$) may be returned. If the first native result is equivalent to the second native result and $API_1$-$E_1$ is mash-able with $API_3$-$E_3$, then it may be inferred that $API_2$-$E_2$ is also mash-able with $API_3$-$E_3$.

Figure 7B:
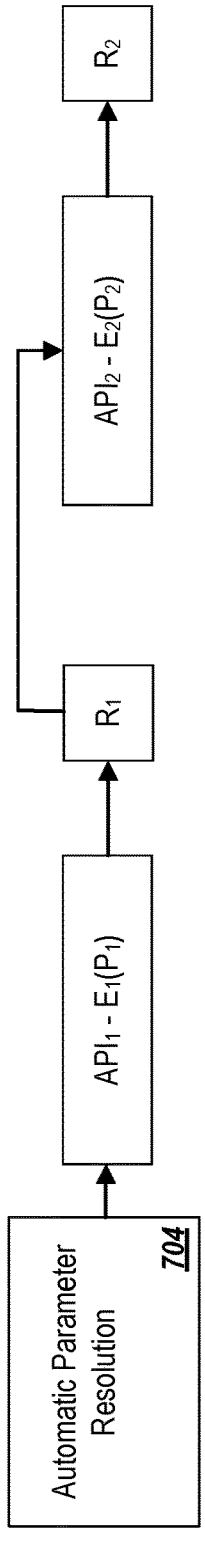
FIG. 7B depicts an example mashup result validation process that may implement in the operating environment of FIG. 1.

FIG. 7B depicts an example mashup result validation process 702 that may implement one or more of the sample parameter values (e.g., 208) generated by the API evaluation system 110. In FIG. 7B, the parameters $API_1$, $E_1$, $R_1$, $P_1$, $API_2$, $E_2$, $R_2$, and $P_2$ are as described above. The process 702 may be determined whether $API_2$-$E_2$ is mash-able with $API_1$-$E_1$. For instance, it may be reported that $API_2$-$E_2$ is mash-able with $API_1$-$E_1$. In the process 702, using the sample parameter value for $P_1$, the first native result may be found. Using the first native result as a sample value for the second parameter, the second native result may be found. If the second native result is not correct, then it may be determined that $API_2$-$E_2$ is not mash-able with $API_1$-$E_1$.

Figure 8:
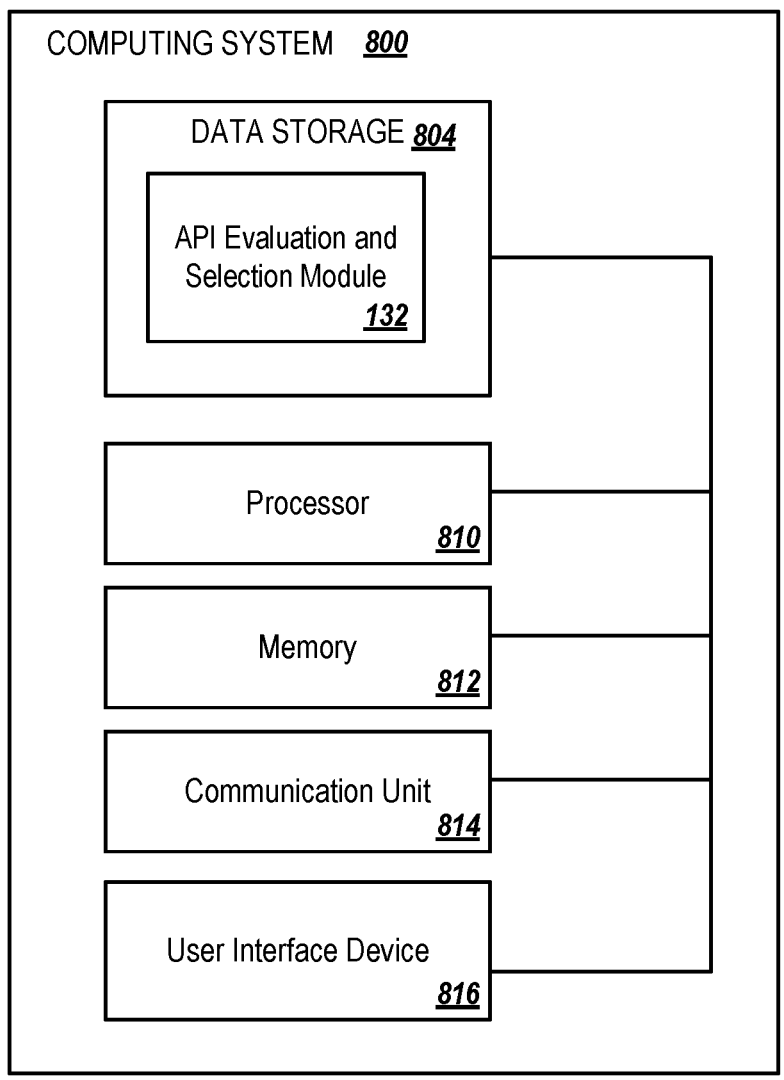
FIG. 8 is a block diagram of an example computing system that is configured for API evaluation and selection.

FIG. 8 illustrates an example computing system 800 configured for API evaluation and selection according to at least one embodiment of the present disclosure. The computing system 800 may be implemented in the operating environment 100 of FIG. 1, for instance. Examples of the computing system 800 may include the API evaluation system 110. The computing system 800 may include one or more processors 810, a memory 812, a communication unit 814, a user interface device 816, and a data storage 804 that includes the API module 132.

The processor 810 may include any suitable special-purpose or general-purpose computer, computing entity, or processing device including various computer hardware or software modules and may be configured to execute instructions stored on any applicable computer-readable storage media. For example, the processor 810 may include a microprocessor, a microcontroller, a digital signal processor (DSP), an ASIC, an FPGA, or any other digital or analog circuitry configured to interpret and/or to execute program instructions and/or to process data.

Although illustrated as a single processor in FIG. 8, the processor 810 may more generally include any number of processors configured to perform individually or collectively any number of operations described in the present disclosure. Additionally, one or more of the processors 810 may be present on one or more different electronic devices or computing systems. In some embodiments, the processor 810 may interpret and/or execute program instructions and/or process data stored in the memory 812, the data storage 804, or the memory 812 and the data storage 804. In some embodiments, the processor 810 may fetch program instructions from the data storage 804 and load the program instructions in the memory 812. After the program instructions are loaded into the memory 812, the processor 810 may execute the program instructions.

The memory 812 and the data storage 804 may include computer-readable storage media for carrying or having computer-executable instructions or data structures stored thereon. Such computer-readable storage media may include any available media that may be accessed by a general-purpose or special-purpose computer, such as the processor 810. By way of example, and not limitation, such computer-readable storage media may include tangible or non-transitory computer-readable storage media including RAM, ROM, EEPROM, CD-ROM or other optical disk storage, magnetic disk storage or other magnetic storage devices, flash memory devices (e.g., solid state memory devices), or any other storage medium which may be used to carry or store desired program code in the form of computer-executable instructions or data structures and that may be accessed by a general-purpose or special-purpose computer. Combinations of the above may also be included within the scope of computer-readable storage media. Computer-executable instructions may include, for example, instructions and data configured to cause the processor 810 to perform a certain operation or group of operations.

The communication unit 814 may include one or more pieces of hardware configured to receive and send communications. In some embodiments, the communication unit 814 may include one or more of an antenna, a wired port, and modulation/demodulation hardware, among other communication hardware devices. In particular, the communication unit 814 may be configured to receive a communication from outside the computing system 800 and to present the communication to the processor 810 or to send a communication from the processor 810 to another device or network (e.g., 124 of FIG. 1).

The user interface device 816 may include one or more pieces of hardware configured to receive input from and/or provide output to a user. In some embodiments, the user interface device 816 may include one or more of a speaker, a microphone, a display, a keyboard, a touch screen, or a holographic projection, among other hardware devices.

The API module 132 may include program instructions stored in the data storage 804. The processor 810 may be configured to load the API module 132 into the memory 812 and execute the API module 132. Alternatively, the processor 810 may execute the API module 132 line-by-line from the data storage 804 without loading them into the memory 812. When executing the API module 132 the processor 810 may be configured to perform a participation verification process as described elsewhere in this disclosure.

Modifications, additions, or omissions may be made to the computing system 800 without departing from the scope of the present disclosure. For example, in some embodiments, the computing system 800 may not include the user interface device 816. In some embodiments, the different components of the computing system 800 may be physically separate and may be communicatively coupled via any suitable mechanism. For example, the data storage 804 may be part of a storage device that is separate from a server, which includes the processor 810, the memory 812, and the communication unit 814, that is communicatively coupled to the storage device. The embodiments described herein may include the use of a special-purpose or general-purpose computer including various computer hardware or software modules, as discussed in greater detail below.

Figure 9:
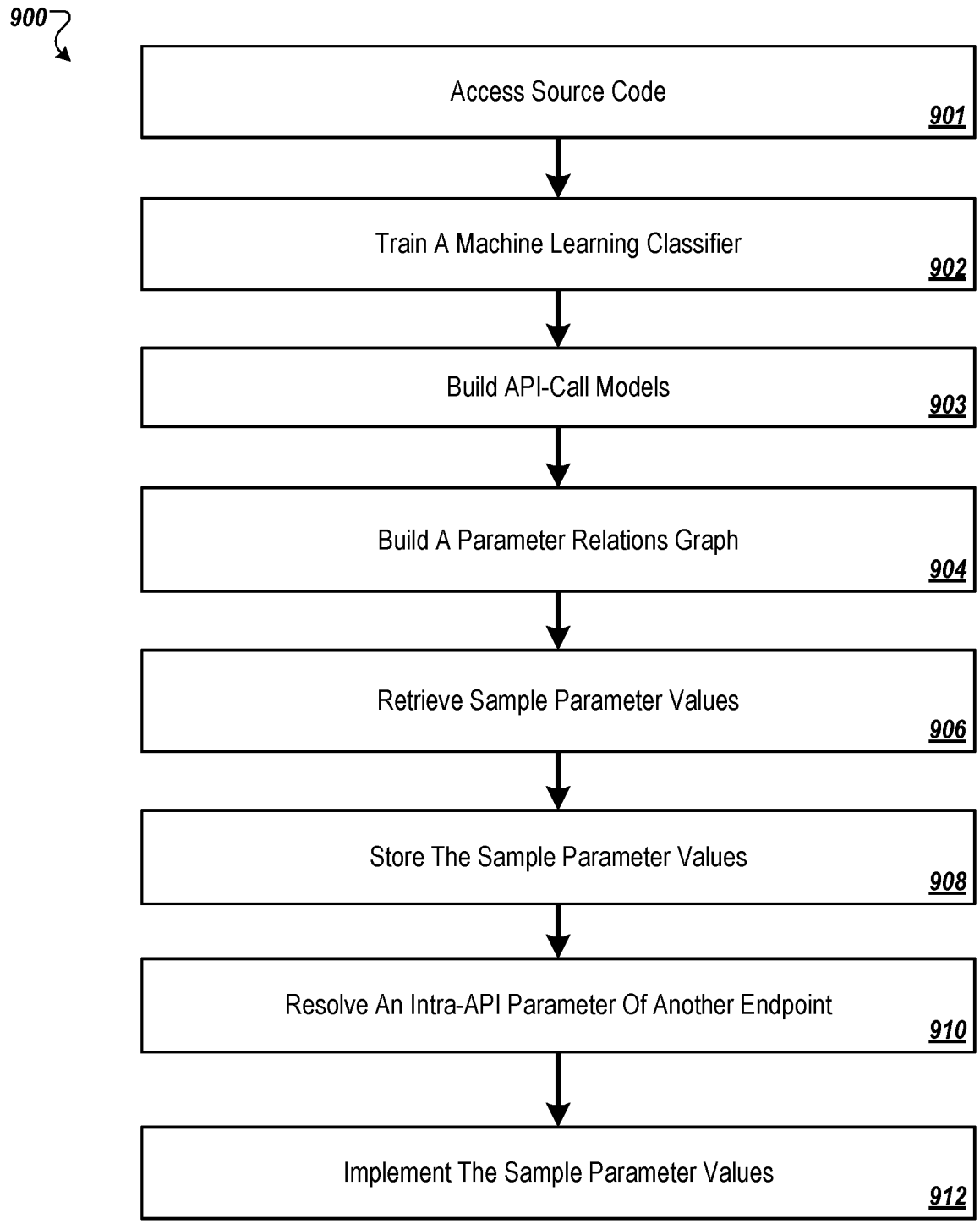
FIG. 9 is a flow chart of an example method of evaluating and selecting APIs for use in software development.

FIG. 9 is a flow chart of an example method 900 of evaluating and selecting an API according to at least one embodiment of the present disclosure. The method 900 may be implemented to evaluate and/or select an API for use in software development, website development, and the like. Although illustrated as discrete blocks, various blocks in FIG. 9 may be divided into additional blocks, combined into fewer blocks, or eliminated, depending on the desired implementation.

The method 900 may begin at block 901 in which source-code may be accessed. The source-code may be accessed from an API repository. The source-code may be written in two or more computer programming languages. At block 902, a machine learning classifier may be trained. The machine learning classifier may be trained using a generalized, extracted API-calls. The generalized, extracted API-calls may be used to learn variations of API-call programming language syntaxes through usage of the API-call programming language syntaxes in the source-code.

At block 903, API-call models may be built. The API-call model may be built that is suitable for the two or more computer programming languages. The API-call model may be built from source-code accessed from an API repository. The building the API-call model may include training a machine learning classifier using a generalized extracted API-call to learn variations of API-call programming language syntaxes through usage of the API-call programming language syntaxes in the source-code.

At block 904, a parameter relations graph may be built. The parameter relations graph may be built based on the backtracking data-flow from API-calls. The API-calls may be extracted from public project repositories based on the API-call model. At block 906, sample parameter values may be retrieved. The sample parameter values may be retrieved from the parameter relations graph. The sample parameter values may be retrieved from a leaf node value of the parameter relations graph.

At block 908, the sample parameter values may be stored. For example, the sample parameter values may be stored in a source-code processor result database. At block 910, an intra-API parameter of another endpoint may be resolved. The intra-API parameter of another endpoint maybe missing from the source-code, but may include the same parameters. The intra-API parameter may be resolved based on parameter metadata from the API repositories and/or the sample parameter values, in some embodiments. At block 912, the sample parameter values may be implemented. The sample parameter values may be implemented in an evaluation interface to evaluate functionality of an API in a software application or functionality in another application.

One skilled in the art will appreciate that, for this and other procedures and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the disclosed embodiments.

Figure 10A:
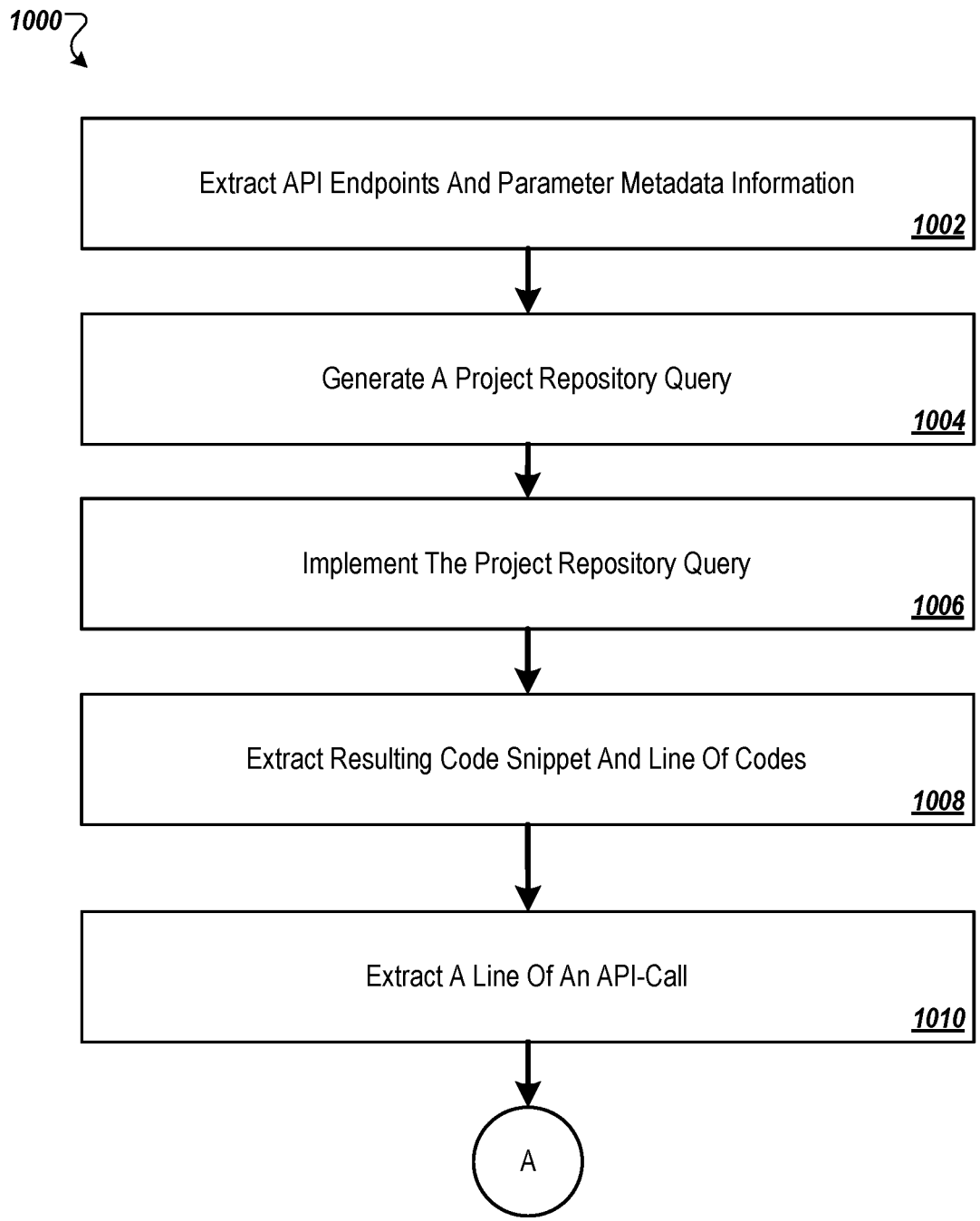
FIGS. 10A and 10B are a flow chart of an example method for building an API-call model.
Figure 10B:
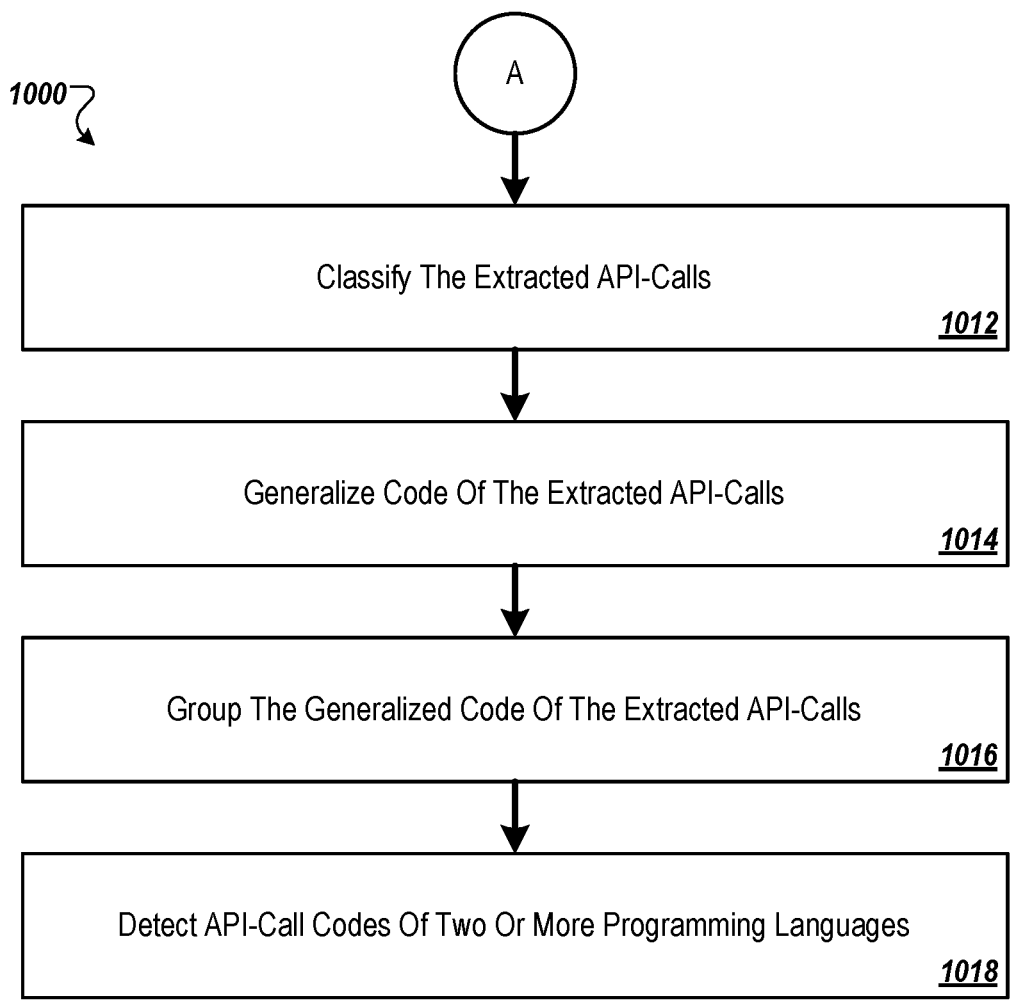

FIGS. 10A and 10B are a flow chart of an example method 1000 for building an API-call model according to at least one embodiment of the present disclosure. In some embodiments, the method 1000 may be implemented as a part of another method. For instance, the method 1000 may be implemented as block 902 of the method 900 described above. Although illustrated as discrete blocks, various blocks in FIGS. 10A and 10B may be divided into additional blocks, combined into fewer blocks, or eliminated, depending on the desired implementation.

Referring to FIG. 10A, the method 1000 may begin at block 1002, in which API endpoints and parameter metadata information may be extracted. The API endpoints and parameter metadata information may be extracted from an API repository. At block 1004, a project repository query may be generated. In some embodiments, the generating the project repository query may include cleaning a host and a basepath URL of unnecessary strings and/or stripping an endpoint at a first parameter placeholder. At block 1006, the project repository query may be implemented. For instance, the project repository query may be automatically implemented. In some embodiments, the project repository query may be automatically implemented using a browser automation technology to search codes of public projects with the query.

Referring to FIG. 10B, at block 1008, resulting code snippet and line of codes may be extracted. The resulting code snippet and line of codes may be extracted that matches endpoint in a result page that is received responsive to implementation of the project repository query. At block 1010, a line of an API-call may be extracted. The line of an API-call may be extracted a using a host, base-path, endpoint information, or some combination thereof.

At block 1012, the extracted API-calls may be classified. In some embodiments, the extracted API-calls may be classified according to a programming language in which the API-call is written. Additionally or alternatively, the extracted API-calls may be classified using extensions of the code or notation provided by the source-code project repository 134. At block 1014, code of the extracted API-calls may be generalized. Generalization of the extracted API-call may include replacing endpoints and parameter values from the API-call code with predefined set of notations. In some embodiments, the predefined set of notations may include endpoint, payload, URL, or some combination thereof.

At block 1016, the generalized code of the extracted API-calls may be grouped. At block 1018, API-call codes of two or more programming languages may be detected. The API-call codes of the programming languages may be detected following training of the machine learning classifier. The API-call codes of the programming languages may be detected utilizing the API-call model for each of the two or more programming languages.

Figure 11:
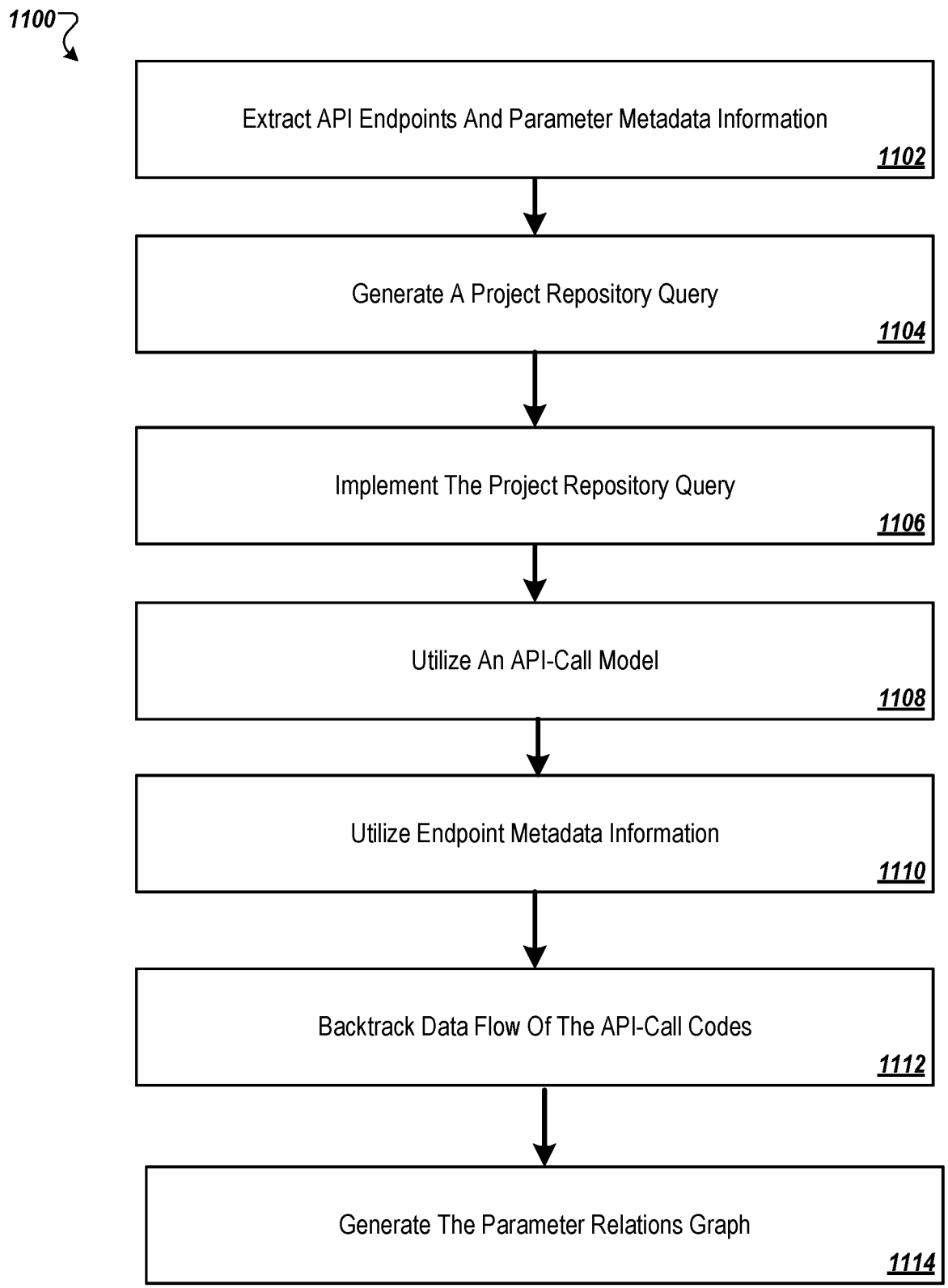
FIG. 11 is a flow chart of an example method for building a parameter relations graph.

FIG. 11 is a flow chart of an example method 1100 for building a parameter relations graph according to at least one embodiment describe in the present disclosure. In some embodiments, the method 1100 may be implemented as a part of another method. For instance, the method 1100 may be implemented as block 904 of the method 900 described above. Although illustrated as discrete blocks, various blocks in FIG. 11 may be divided into additional blocks, combined into fewer blocks, or eliminated, depending on the desired implementation.

The method 1100 may begin at block 1102 in which API endpoints and parameter metadata information may be extracted. The API endpoints and the parameter metadata information may be extracted from the API repository. At block 1104, a project repository query may be generated. In some embodiments, the generating the project repository query may include cleaning a host and a basepath URL of unnecessary strings and/or stripping an endpoint at a first parameter placeholder. At block 1106, the project repository query may be implemented. The project repository query may be implemented automatically. The project repository query may be implemented using a browser automation technology to search codes of public projects with the query.

At block 1108, an API-call model may be utilized. The API-call model that is built for one or more programming languages may be utilized for one or more purposes. For instance, the API-call model may be utilized to find and extract a direct API-call code. At block 1110, an endpoint metadata information may be utilized. The endpoint metadata information may be utilized. The endpoint metadata information may be extracted from the API repository. In some embodiments, the endpoint metadata information may be utilized to decompose codes and classify parameters into one or more different categories. In these and other embodiments, the different categories may include path, query, header, body, or some combination thereof. At block 1112, data flow of the API-call codes may be backtracked. The data flow of the API-call codes may be backtracked to extract a relationship between variables. The backtracking may include tracking a dataflow of the from an assignment side of an expression in the code to an assigned side of another expression in the code. At block 1114, the parameter relations graph may be generated. The parameter relations graph may be generated based on the extracted relationships between variables.

Figure 12:
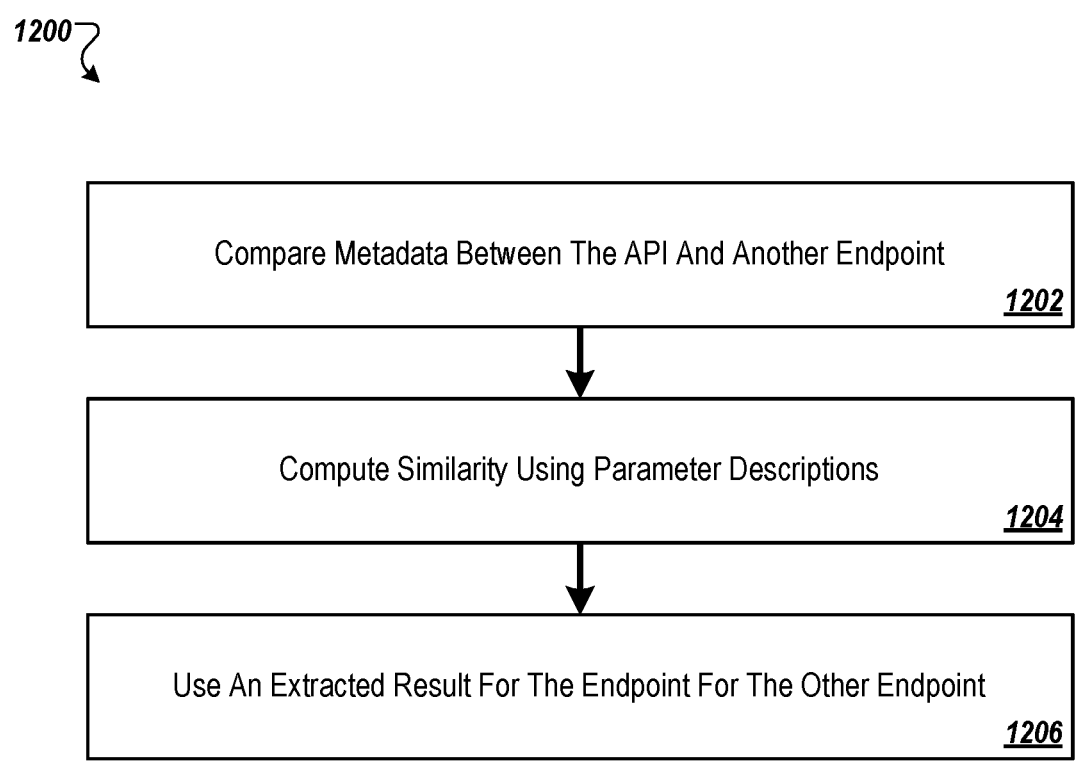
FIG. 12 is a flow chart of an example method for resolving an intra-API parameter of another endpoint, all according to at least one embodiment described in the present disclosure.

FIG. 12 is a flow chart of an example method 1200 for resolving an intra-API parameter of another endpoint according to at least one embodiment describe in the present disclosure. In some embodiments, the method 1200 may be implemented as a part of another method. For instance, the method 1200 may be implemented as block 910 of the method 900 described above. Although illustrated as discrete blocks, various blocks in FIG. 12 may be divided into additional blocks, combined into fewer blocks, or eliminated, depending on the desired implementation.

The method 1200 may begin at block 1202, in which metadata may be compared. For instance, the metadata between the API and another endpoint may be compared. At block 1204, similarity using parameter descriptions may be computed. At block 1206, an extracted result for the endpoint may be used for the other endpoint in the same API. For instance, responsive to the similarity in the metadata being indicative a similar name and a similar type and the computed similarities of the parameter descriptions being above a particular threshold, the extracted result for the endpoint may be used for the other endpoint in the same API.

The methods 900, 1000, 1100, 1200 or any combination thereof may be performed in an operating environment such as the operating environment 100 of FIG. 1. The methods 900, 1000, 1100, and 1200 may be programmably performed in some embodiments by the API evaluation system 110 described with reference to FIG. 1. In some embodiments, the API evaluation system 110 or another computing system may include or may be communicatively coupled to a non-transitory computer-readable medium (e.g., the memory 812 of FIG. 8) having stored thereon programming code or instructions that are executable by one or more processors (such as the processor 810 of FIG. 8) to cause a computing system and/or the API evaluation system 110 to perform or control performance of the methods 900, 1000, 1100, and 1200. Additionally or alternatively, the API evaluation system 110 may include the processor 810 described elsewhere in this disclosure that is configured to execute computer instructions to cause the API evaluation system 110 or another computing system to perform or control performance of the methods 900, 1000, 1100, and 1200.

The embodiments described herein may include the use of a special purpose or general purpose computer including various computer hardware or software modules, as discussed in greater detail below.

Embodiments described herein may be implemented using computer-readable media for carrying or having computer-executable instructions or data structures stored thereon. Such computer-readable media may be any available media that may be accessed by a general purpose or special purpose computer. By way of example, and not limitation, such computer-readable media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general purpose or special purpose computer. Combinations of the above may also be included within the scope of computer-readable media.

Computer-executable instructions may include, for example, instructions and data, which cause a general purpose computer, special purpose computer, or special purpose processing device (e.g., one or more processors) to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the terms "module" or "component" may refer to specific hardware implementations configured to perform the operations of the module or component and/or software objects or software routines that may be stored on and/or executed by general purpose hardware (e.g., computer-readable media, processing devices, etc.) of the computing system. In some embodiments, the different components, modules, engines, and services described herein may be implemented as objects or processes that execute on the computing system (e.g., as separate threads). While some of the system and methods described herein are generally described as being implemented in software (stored on and/or executed by general purpose hardware), specific hardware implementations or a combination of software and specific hardware implementations are also possible and contemplated. In this description, a "computing entity" may be any computing system as previously defined herein, or any module or combination of modulates running on a computing system.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present inventions have been described in detail, it should be understood that the various changes, substitutions, and alterations could be made hereto without departing from the spirit and scope of the invention.

What is claimed is:

1. A method for evaluating and selecting an application programming interface (API), the method comprising:
   accessing source-code in two or more computer programming languages from an API repository;
   training a machine learning classifier using generalized, extracted API-calls to learn variations of API-call programming language syntaxes through usage of the API-call programming language syntaxes in the source-code;
   based on the machine learning classifier, building API-call models for the two or more computer programming languages;
   building a parameter relations graph based on backtracking data-flow from API-calls extracted from public, source-code project repositories based on the API-call models;
   retrieving sample parameter values from the parameter relations graph; and
   implementing the sample parameter values in an evaluation interface to evaluate functionality of an API in a software application.

2. The method of claim 1, further comprising:
   storing the sample parameter values in a source-code processor result database; and
   based on parameter metadata from the API repository and the sample parameter values, resolving an intra-API parameter of an endpoint that is missing from the source-code but includes parameters of a resolved endpoint.

3. The method of claim 2, wherein the resolving comprises:
   comparing metadata between the API and another endpoint;
   computing similarity using parameter descriptions; and
   responsive to the similarity in the metadata being indicative of a similar name and a similar type and the computed similarity of the parameter descriptions being above a particular threshold, using an extracted result for the endpoint for the other endpoint in the same API.

4. The method of claim 1, wherein the building the API-call model further includes:
   extracting API endpoints and parameter metadata information from the API repository;
   generating a project repository query;
   automatically implementing the project repository query using a browser automation technology to search codes of public projects with the query;
   extracting resulting code snippet and line of codes that match an endpoint in a result page that is received in response to implementation of the project repository query;
   further extracting a line of an API-call using a host, base-path, and endpoint information;
   classifying the extracted API-calls according to a programming language in which the API-call is written using extensions of the code or notation provided by the source-code project repository;
   generalizing code of the extracted API-calls, the generalizing the extracted API-call including replacing endpoints and parameter values from the API-call code with a predefined set of notations;
   grouping the generalized code of the extracted API-calls; and
   following training of the machine learning classifier, detecting two or more API-call codes of the programming languages utilizing the API-call model for each of the two or more programming languages.

5. The method of claim 4, wherein the predefined set of notations includes endpoint, payload, and URL.

6. The method of claim 1, wherein:
   the building the parameter relations graph includes:
      extracting API endpoints and parameter metadata information from the API repository;
      generating a project repository query;
      automatically implementing the project repository query using a browser automation technology to search codes of public projects with the query;
      utilizing an API-call model built for each programming language to find and extract a direct API-call code;
      utilizing endpoint metadata information extracted from the API repository to decompose codes and classify parameters into one or more different categories;
      backtracking data flow of the API-call codes to extract a relationship between variables; and
      generating the parameter relations graph based on the extracted relationships between variables; and
   the sample parameter values are retrieved from a leaf node value of the parameter relations graph.

7. The method of claim 6, wherein:
   the backtracking includes tracking a dataflow of the from an assignment side of an expression in the code to an assigned side of another expression in the code;

the generating the project repository query includes cleaning a host and a basepath URL of unnecessary strings and stripping an endpoint at a first parameter placeholder; and the different categories include path, query, header, and body.

8. A non-transitory computer-readable medium having encoded therein programming code executable by one or more processors to perform or control performance of operations comprising:

accessing source-code in two or more computer programming languages from an API repository;

training a machine learning classifier using generalized, extracted API-calls to learn variations of API-call programming language syntaxes through usage of the API-call programming language syntaxes in the source-code;

based on the trained machine learning classifier, building API-call models for the two or more computer programming languages;

building a parameter relations graph based on backtracking data-flow from API-calls extracted from public, source-code project repositories based on the API-call models;

retrieving sample parameter values from the parameter relations graph; and implementing the sample parameter values in an evaluation interface to evaluate functionality of an API in a software application.

9. The non-transitory computer-readable medium of claim 8, wherein the operations further comprise:

storing the sample parameter values in a source-code processor result database; and based on parameter metadata from the API repository and the sample parameter values, resolving an intra-API parameter of an endpoint that is missing from the source-code but includes parameters of a resolved endpoint.

10. The non-transitory computer-readable medium of claim 9, wherein the resolving comprises:

comparing metadata between the API and another endpoint;

computing similarity using parameter descriptions; and responsive to the similarity in the metadata being indicative of a similar name and a similar type and the computed similarity of the parameter descriptions being above a particular threshold, using an extracted result for the endpoint for the other endpoint in the same API.

11. The non-transitory computer-readable medium of claim 8, wherein the building the API-call model further includes:

extracting API endpoints and parameter metadata information from the API repository;

generating a project repository query;

automatically implementing the project repository query using a browser automation technology to search codes of public projects with the query;

extracting resulting code snippet and line of codes that match an endpoint in a result page that is received responsive to implementation of the project repository query;

further extracting a line of an API-call using a host, base-path, and endpoint information;

classifying the extracted API-calls according to a programming language in which the API-call is written using extensions of the code or notation provided by the source-code project repository;

generalizing code of the extracted API-calls, the generalizing the extracted API-call including replacing endpoints and parameter values from the API-call code with a predefined set of notations;

grouping the generalized code of the extracted API-calls; and following training of the machine learning classifier, detecting two or more API-call codes of the programming languages utilizing the API-call model for each of the two or more programming languages.

12. The non-transitory computer-readable medium of claim 11, wherein the predefined set of notations includes endpoint, payload, and URL.

13. The non-transitory computer-readable medium of claim 8, wherein:

the building the parameter relations graph includes:

extracting API endpoints and parameter metadata information from the API repository;

generating a project repository query;

automatically implementing the project repository query using a browser automation technology to search codes of public projects with the query;

utilizing an API-call model built for each programming language to find and extract a direct API-call code;

utilizing endpoint metadata information extracted from the API repository to decompose codes and classify parameters into one or more different categories;

backtracking data flow of the API-call codes to extract a relationship between variables; and generating the parameter relations graph based on the extracted relationships between variables; and the sample parameter values are retrieved from a leaf node value of the parameter relations graph.

14. The non-transitory computer-readable medium of claim 13, wherein:

the backtracking includes tracking a dataflow from an assignment side of an expression in the code to an assigned side of another expression in the code;

the generating the project repository query includes cleaning a host and a basepath URL of unnecessary strings and stripping an endpoint at a first parameter placeholder; and the different categories include path, query, header, and body.

15. A system configured for evaluation and selection of an application programming interface (API), the system comprising:

an API-call model learning component configured to:

access source-code in two or more computer programming languages from an API repository;

train a machine learning classifier using a generalized, extracted API-calls to learn variations of API-call programming language syntaxes through usage of the API-call programming language syntaxes in the source-code; and based on the trained machine learning classifier, build API-call models for the two or more computer programming languages; and a source-code processor component that is configured to:

build a parameter relations graph based on the backtracking data-flow from API-calls that are extracted from public, source-code project repositories based on the API-call model;

store the sample parameter values in a source-code processor result database;

retrieve the sample parameter values from the parameter relations graph; and implement the sample parameter values in an evaluation interface to evaluate functionality of an API in a software application.

16. The system of claim 15, further comprising an intra-API parameter resolution component that is configured to resolve an intra-API parameter of an endpoint that is missing from the source-code but includes parameters of a resolved endpoint based on parameter metadata from the API repository and the sample parameter values.

17. The system of claim 16, wherein the resolution of the intra-API parameter comprises:

comparing metadata between the API and another endpoint;

computing similarity using parameter descriptions; and responsive to the similarity in the metadata being indicative of a similar name and a similar type and the computed similarity of the parameter descriptions being above a particular threshold, using an extracted result for the endpoint for the other endpoint in the same API.

18. The system of claim 15, wherein the building of the API-call model further includes:

extracting API endpoints and parameter metadata information from the API repository;

generating a project repository query;

automatically implementing the project repository query using a browser automation technology to search codes of public projects with the query;

extracting resulting code snippet and line of codes that match an endpoint in a result page that is received in response to implementation of the project repository query;

further extracting a line of an API-call using a host, base-path, and endpoint information;

classifying the extracted API-calls according to a programming language in which the API-call is written using extensions of the code or notation provided by the source-code project repository;

generalizing code of the extracted API-calls, the generalizing the extracted API-call including replacing endpoints and parameter values from the API-call code with a predefined set of notations;

grouping the generalized code of the extracted API-calls; and following training of the machine learning classifier, detecting two or more API-call codes of the programming languages utilizing the API-call model for each of the two or more programming languages.

19. The system of claim 15, wherein:

the building the parameter relations graph includes:

extracting API endpoints and parameter metadata information from the API repository;

generating a project repository query;

automatically implementing the project repository query using a browser automation technology to search codes of public projects with the query;

utilizing API-call model built for each programming language to find and extract a direct API-call code;

utilizing endpoint metadata information extracted from the API repository to decompose codes and classify parameters into one or more different categories;

backtracking data flow of the API-call codes to extract a relationship between variables; and generating the parameter relations graph based on the extracted relationships between variables; and the sample parameter values are retrieved from a leaf node value of the parameter relations graph.

20. The system of claim 19, wherein:

the backtracking includes tracking a dataflow from an assignment side of an expression in the code to an assigned side of another expression in the code;

the generation of the project repository query includes cleaning a host and a basepath URL of unnecessary strings and stripping an endpoint at a first parameter placeholder; and the different categories include path, query, header, and body.

* * * * *